United States Patent [19]

Neidell

[11] Patent Number: 5,693,885
[45] Date of Patent: Dec. 2, 1997

[54] SAMPLING AND RECONSTRUCTION OF PROPAGATING WAVEFIELDS

[75] Inventor: Norman S. Neidell, Houston, Tex.

[73] Assignee: Wavefield Image, Inc., Houston, Tex.

[21] Appl. No.: 661,189

[22] Filed: Jun. 10, 1996

[51] Int. Cl.$^6$ .................................................... G01S 15/00
[52] U.S. Cl. ........................... 73/597; 73/596; 364/421
[58] Field of Search .................................. 367/50, 51, 52,
367/73, 38; 3/596, 597; 364/421; 128/660.07,
660.01

[56] References Cited

U.S. PATENT DOCUMENTS

| | | | |
|---|---|---|---|
| 4,849,945 | 7/1989 | Widrow | 367/30 |
| 4,922,465 | 5/1990 | Pieprzak et al. | 367/38 |
| 4,964,087 | 10/1990 | Widrow | 367/45 |
| 5,309,360 | 5/1994 | Monk et al. | 364/42 |
| 5,463,594 | 10/1995 | Lindsey et al. | 367/38 |
| 5,465,722 | 11/1995 | Fort et al. | 73/597 |
| 5,596,546 | 1/1997 | Wisecup | 367/47 |

OTHER PUBLICATIONS

Neidell, *The Leading Edge*, pp. 764–768, Jul. 1994.
Vermeer, Round Table, *The Leading Edge*, pp. 989–990, Sep. 1995.
Neidell, Round Table, *The Leading Edge*, pp. 990–993, Sep. 1995.
Neidell, et al., Expanded Abstracts, SEG International Exposition and 64th Annual Meeting, pp. 914–918, Oct. 1994.
Bednar, Round Table, *The Leading Edge*, pp. 763–764, Jun. 1996.
Hagendoorn, J.G., *Geophys. Prop.*, vol. II, No. 2, Jun. 1954, pp. 7, 86–127.

*Primary Examiner*—Elizabeth L. Dougherty
*Assistant Examiner*—Ronald Biegel
*Attorney, Agent, or Firm*—Pravel, Hewitt, Kimball & Krieger

[57] ABSTRACT

Acquired signals representing samples of propagating wavefields are processed using space-time linked variable methods to form images having better definition and resolution than may be obtained by conventional methods. Frequencies accessed include those anticipated as well as some apparently beyond those deemed feasible according to Nyquist criteria as well as those present in the wavefield source.

The signals and physical features may be obtained in tomography (medical CT scans), echo location (radar or sonar) or seismic imaging for example. Signals are processed maintaining interrelation of the linked variables of time and space, rather than following the conventionally accepted current techniques which treat the time and space variables independently.

Definition and resolution of images are obtained beyond those normally considered possible with earlier techniques by understanding and correctly interpreting the information content of a sampled wavefield. Data acquisition speed can be greatly increased, while acquisition costs are also reduced since the methods described require less data and use such data as available more effectively.

62 Claims, 17 Drawing Sheets

MIGRATION OF FULL DATA SET

AS ABOVE WITH MODEL SUPERIMPOSED

------- LOCATION OF AMPLITUDE SPECTRUM

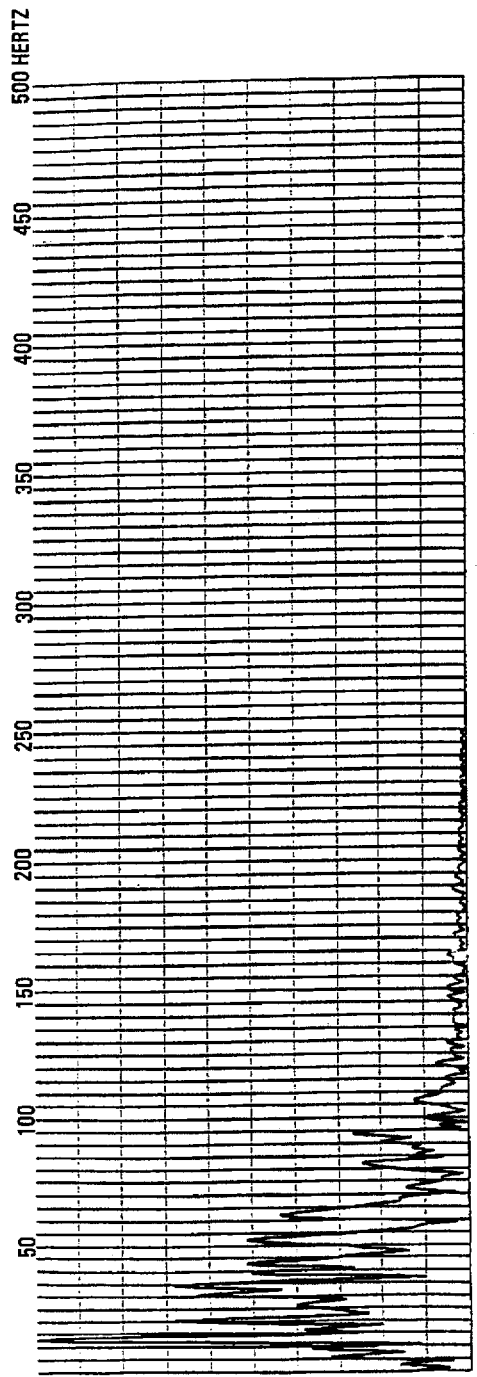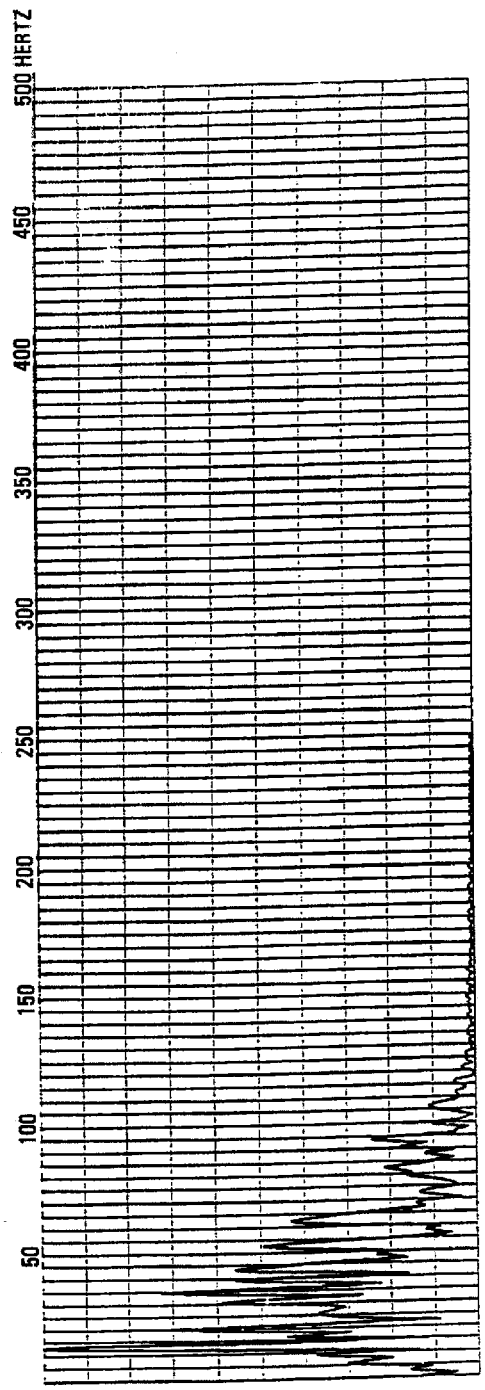
COMMERCIAL PACKAGE       CDP 2150 TIME WINDOW 0.8 TO 1.2 SECONDS       *FIG. 11C*

SAMPLING AND RECONSTRUCTION OF PROPAGATING WAVEFIELDS

BACKGROUND OF INVENTION

1. Field of Invention

The present invention relates to acquisition and processing of signals representing samples of propagating wavefields to form images having better definition and resolution than may be obtained by conventional methods.

2. Description of Prior Art

Measuring, observing, recovering or recording samples of a propagating wavefield to derive information encompasses a broad range of applications. Propagating wavefields may arise naturally or can be deliberately initiated by a variety of means, but in all cases they behave in accord with the well known Wave Equation in some form. Since the Wave Equation describes a wavefield completely in terms of time and spatial variations whether this wavefield is reflected, directly received or both, information is available in a form necessary to decode, echo-locate, image, navigate or apply whatever reconstruction operations desired in order to attain the desired use. Supplementary knowledge may be needed to complete these tasks, such as codes, reference times or positions and propagation parameters, but with these in hand the computations are otherwise well known and widely employed.

The Wave Equation is of course one of the most fundamental equations of classical physics. Solutions to this Equation by analytic and numerical means have been addressed as an ongoing activity for many years. Even today with the availability of massive computing power, solutions can remain a daunting task owing to the "linkage" or interaction amongst all of the variables. A velocity field or function is in fact the scaling mechanism which formally ties the time dimension to the spatial components.

Solving the Wave Equation in discrete approximation either directly or working from some form of solution by numerical means has been considered especially burdensome if all variables involved are treated simultaneously. Hence, many previous approaches to problems involving the Wave Equation have deliberately separated the time and space variables to achieve computational advantage. Mechanisms such as Fourier transformation were used to achieve variable separation and allow treatment of the wavefield essentially one frequency component at a time. Other approaches address the Wave Equation itself on a computational grid having an effective sampling grid as used to sample the wavefield. Hence, so far as is known, conventional practice as now widely prevalent has been to consider the time and spatial variables individually in terms of their information content about the wavefield. Such view apparently limits the to attainable imaging resolution to the properties of the source illumination and the wavefield sampling according to Nyquist theory as applied to the individual variables.

SUMMARY OF INVENTION

Briefly, with the present invention it has been discovered that coupled variable treatment of the Wave Equation can fully access the wavefield information structure. Hence image sampling from wavefield reconstruction may be finer than the wavefield sampling itself. For applications such as tomography (medical CT Scans), echo location, seismic imaging to name a representative few, linked variable solutions allow definition and resolution beyond that normally considered possible arising from unnecessarily imposing limits for single variable sampling theory. Correspondingly, coarser sampling or acquiring less data is actually needed to achieve any level of definition or resolution than usual guidelines for single variable sampling theory teach.

Practical consequences of using coupled variable Wave Equation solutions mean that data acquisition speed will increase and costs will decrease with better results obtained more cheaply. Implications for medical imaging, navigation, subsurface seismic imaging, indeed any wavefield reconstruction application are quite direct and immediate.

BRIEF DESCRIPTION OF THE DRAWINGS

FIG. 11C compares amplitude spectra from the images of FIG. 11A and 11B at the common designated location.

DESCRIPTION OF PREFERRED EMBODIMENT

1. Glossary of Terms

Figure 1:
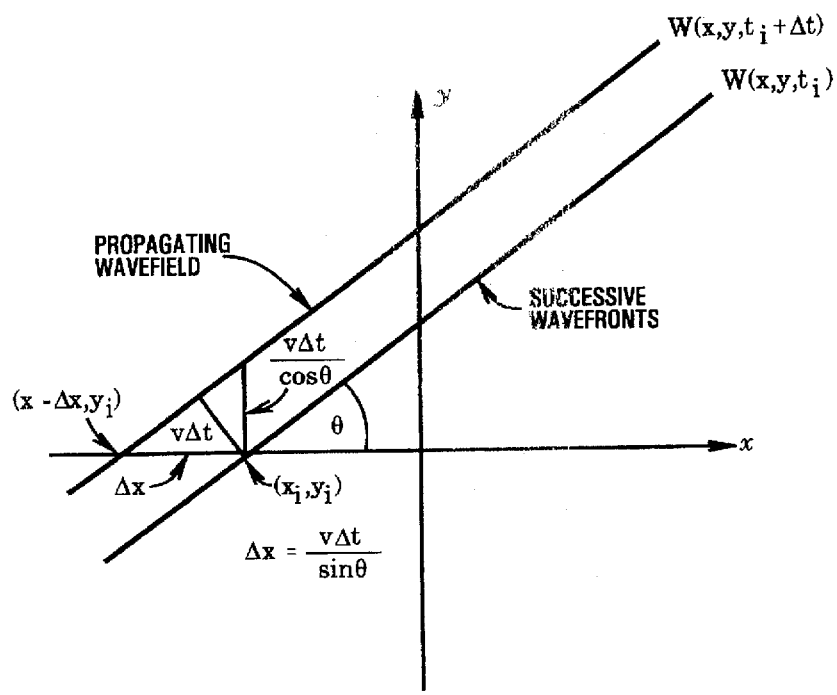
FIG. 1 is a schematic two-dimensional diagram of a wavefield function and certain of its spatial and temporal characteristics.

For ease of reference, terms as defined for use in describing the present invention are set forth below. As will be evident to those skilled in the art, the definitions incorporate both current standard meanings as well as extended meanings as prove necessary. They include the following:

Acoustic Impedance—A material property, the density-velocity product which gives rise to reflection of propagating acoustic wavefields in respect to contrasts in this property. See also impedance.

Aliasing—A term from signal theory describing the corruption of a discretely sampled signal owing to the presence of frequency content in that signal prior to discrete sampling beyond the Nyquist limit of that sampling.

Amplitude—The intensity function of space and time describing a propagating wavefield.

Antenna Function—A mathematical description of locations which are to be used to sample a propagating wavefield.

Apparent Frequency—Fourier transformation component of a wavefield image variable. Since variables of the wavefield sampling are not linearly related to the variables of like name in the image space but are related by the linkage inherent in wave propagation, frequencies may be encountered outside of those deemed properly sampled or attainable from the properties of the wavefield illumination and the sampling operation. All frequencies describing the image whether in space or time must be considered apparent if referenced to the domain of the wavefield sampling and its independent variables.

Apparent Source—A Huygens' or virtual source which is also a grid cell and an imaging or resolution element.

Apparent Wavenumber—See apparent frequency.

Fourier Transform—Linear integral formulas involving complex exponential functions which convert timed space functions into their frequency domain equivalents. These are summations involving harmonic trigonometric functions in their discrete approximation.

Frequency—A component of the Fourier decomposition along a variable often used in signal theory to assess information content.

Fresnel Zone—As used in seismic imaging, the first Fresnel Zone as defined in optics for the dominant frequency corresponding to that region of illumination having constructive interference from which reflections arise and over which averaging occurs. Fresnel Zones increase in size as the dominant frequency is lowered, as effective propagation velocity is reduced, and also with increasing propagation time.

Grid Cell—A region defined in a multi-dimensional space of size related to the sampling of those variables which define the space itself and which is also a resolution or imaging element.

Huygens' Principle—The concept for describing a propagating wavefield in which each point on a wavefront is considered as a new and independent apparent source. This principle is extended in the present invention to include wavefields propagating in a material which is to be imaged.

Huygens-type Imaging or Extended Huygens' Imaging—Linked-variable methods of wavefield reconstruction for imaging virtual sources or resolution elements representing an extension of Huygens' Principle according to this present invention.

Huygens' Source—A virtual or apparent source consisting of a grid cell, imaging element or resolution element in a propagation medium. Such usage represents also an extension of Huygens' Principle according to the present invention.

Image—A defined locus or mapping of wavefield amplitude values over grid cells, pixels, resolution elements or voxels constituting selective wavefield reconstruction.

Imaging—The activity of forming an image.

Impedance—A material property of the propagation medium whose changes affect the propagating wavefield in all directions.

Imaging Element—A grid cell or resolution element which may also be an apparent, Huygens' or virtual source within a propagation medium.

Intermediate Grid—A working grid.

Interpolation—A mechanical procedure for estimating values of a function other than where it is sampled based on averages of nearby samples, weighted only according to proximity to the sampled values.

Kirchhoff Method—Wave field reconstruction or imaging methods involving calculations over definable surfaces, usually simple conic sections or surfaces having an axis of revolution. Commonly used in seismic reflection processing but unrelated to analytic Kirchhoff integral methods as practiced in optics and other fields.

Linked-Variable Solution—Methods of wavefield reconstruction or imaging deriving from an appropriate Wave Equation or solution where all variables are treated simultaneously and are not separated to simplify computational demands.

Master Grid—The final arrangement of grid cells or pixels into which amplitude values are added to form an image. Sizes of the elements are adequate according to sampling theory to represent the image. This term is more commonly used when the particular imaging method requires use also of an intermediate or working grid.

Modified Kirchhoff Imaging or Modified Kirchhoff Migration—Wavefield reconstruction or imaging according to the present invention using modified Huygens-type imaging in seismic and other applications where simple velocity functions define computations over ellipsoids or hyperboloids of revolution.

Nyquist Limit—A term from signal theory describing that limiting frequency beyond which the regular discrete samples of a function of a variable may no longer be represented with fidelity. For a discrete sampling having regular intervals, the Nyquist limit is the reciprocal of twice the sampling interval.

Pixel—A grid cell in a two-dimensional space.

Propagation Medium—The environment in which real sources, propagating wavefields and antenna functions exist which is characterized by properties which affect the propagating wavefield.

Propagating Wavefield—A disturbance having amplitude varying with space and time within a propagation medium initiated by a real source.

Real Source—The causative element for a propagating wavefield.

Receiver Element—An elemental component of an antenna function wherein samples of a propagating wavefield may be received or recorded.

Reference Location—Position in a propagation medium designated for some special purpose. Usually the location of a real source or a receiver element of an antenna function.

Resolution Element—A grid cell, pixel, voxel or component of an image. It may also be an apparent, Huygens' or virtual source.

Sampling—The activity of gathering a suite of values as representing a whole; in this instance, a suite of amplitude values over space and time representing a propagating wavefield.

Sampling Interval—The spacing between discrete samples of a variable. A concept of particular importance in signal theory.

Seismic Wavelet—A wavelet as defined in a seismic reflection application.

Source—A real source unless annotated as an apparent, Huygens' or virtual source.

Time—An independent variable of all Wave Equations. See also travel time.

Travel Time—The time of transit from one designated element to another whose significance varies with the particular application. Actual wavefield travel paths involve all the spatial variables and corresponding velocity functions, hence relationship of travel time to any spatial variable or distance in the original wavefield sampling can be variable and quite complex. Simple rescalings of the image spatial variables using velocity functions only are typically inadequate to effect travel time to distance transformations and can lead to paradoxical results in terms of frequency content if the relationships are viewed as discrete linear systems.

Velocity—A material property of a propagation medium which describes the rate of travel for a propagating wavefield in that medium.

Velocity Function—An expression of the material property of a propagation medium as a function of spatial and/or spatial and temporal variables. Virtual Source—An apparent or Huygens' Source. Also, a grid cell or resolution element.

Voxel—A grid cell or resolution element having three-dimensions and rectangular geometry.

Wave Equation—A mathematical construct describing a propagating wavefield within a propagation medium as a function of space and time variables. Real source parameters and material parameters of the propagation medium are necessary information for such description.

Wavefield—A general description of a energy travelling through a propagating medium.

Wavefield Reconstruction—The development of a propagating wavefield from a sampling in terms of amplitudes as function of space or time variables. Images constitute selective wavefield reconstruction.

Wavefront—Amplitude values for a propagating wavefield for a constant time value.

Wavelet—A time history of amplitude as recorded at a receiver element describing a propagating wavefield of short duration and impulsive nature having zero average value for elastic disturbances.

Working Grid—An intermediate arrangement of grid cells or pixels into which amplitudes are added as a step in wavefield imaging or wavefield reconstruction. Size of the elements is adequate to represent the image according to sampling theory criteria.

2. Sampling Propagating Wavefields

One may consider a wavefield $W(x,y,t)$ continuous in space and time propagating in a two-dimensional space described by variables x and y over time variable t. Now one can take the propagation velocity function V to be everywhere known and the wavefield geometry will be taken as known over all time t as well. An antenna function is now introduced along some function $A(x,y)$ which will be used to sample the Wavefield $W(x,y,t)$. $A(x,y)$ can be continuous or discontinuous, single-valued or multi-valued, finite or infinite and/or sampled in regular or irregular fashion, but it can not parallel the wavefield over all time t.

Consider now one wavefront of the wavefield at time $t_i$ having constant amplitude value $W_i$. One can assume that antenna function $A(x,y)$ intercepts $W_i$ at $A_j(x_j,y_j)$ where more than one x,y pairing may apply—but not all x,y values, since this has been previously ruled out by the condition of absence of paralleling.

Suppose now the antenna function $A(x,y)$ samples the wavefield $W(x,y,t)$ discretely in time with interval $\Delta t$, and $t_i$ happens to be one such time sample. It has become standard practice to believe that the time variable frequency content of $W(x,y,t)$, the wavefield sampled discretely in time for fixed x and y is limited to the bandwidth between zero and $\frac{1}{2}\Delta t$ with this high frequency limit being called the Nyquist frequency. Similar considerations for a spatial variable can be used to define an analogous spatial Nyquist frequency (or wavenumber).

One can demonstrate here that such frequency limits are in fact perceived, and not actually valid. The oversight which misdirects the collective thinking derives largely from those computational methods which efficiently treat the Wave Equation by decoupling the spatial and time variables. Such approach encourages application of signal theory concepts to the variables independently without considering the effect of their linkage on the information content.

To appreciate how to circumvent the apparent limitation—here regarding frequency as related to the time variable t for illustrative purposes, consider two successive wavefield amplitude values sampled in time taken at $x_j$, $y_j$. Specifically, these are $W(x_j,y_j,t_i)$ and $W(x_j, y_j, t_i+\Delta t)$ respectively. The usual presumption then is that no wavefield amplitude values between $t_i$ and $t_i+\Delta t$ are sampled, and so a Nyquist frequency limit applies.

It is clear however that at least some wavefield amplitude values as occur between times $t_i$ and $t_i+\Delta t$ will necessarily appear at other times elsewhere along the antenna function $A(x,y)$—that is for $x \neq x_j$, $y \neq y_j$, but at different times owing to the required geometric disparity between the antenna function $A(x,y)$ and the wavefield $W(x,y,t)$. Since the geometries are known however for both functions, the effective sampling of the wavefield $W(x,y,t)$ as viewed over the discrete time variable t is at a rate finer than indicated by Δt. To realize such information however, one must not treat the spatial variables independently of their coupling to the time values. That is, those operators which address the wavefield sampled in time as it has been defined require the capacity to explicitly recognize for example that the amplitude value $W(x_k,y_k,t_k)$ also represents $W(x_j, y_j, t_i+n\Delta t)$. where n is some fractional value greater than 0 but less than 1.

This discussion so far has been cast in rather general terms except for the limitation of having only two spatial variables. To illustrate the benefits and practical nature of this invention, a preferred embodiment for the computing—intensive case of a reflected wavefield will be described later which further reduces the efforts required to implement the linked variable solution and image the propagation medium with high resolution. A special case shown next in FIG. 1 illustrates this principle under discussion quite simply. In FIG. 1 we note a wavefield function with constant amplitude wavefronts which are linear in x and y and at any time t impinging on a linear antenna function where y=0(on the x axis). A wavefront of the wavefield corresponding to t=$t_i$ is shown as making an angle θ with the antenna function. The wavefront for $t_i+\Delta t$ is also shown.

Wavefield W(x,y,t) as sampled at both ($x_i$,0) and at ($x_i$-Δx,0) consists of recorded time samples acquired synchronously at intervals of Δt. If Δx is in fact a discrete sampling interval in x for the antenna function, it follows that no wavefield amplitudes at increments other than integral multiples of Δt will be sampled if and only if $\Delta x_o$=VΔt/sin θ where we are assuming also propagation with constant velocity V. It should be clear that continuous sampling along the antenna function or sampling increments smaller than $\Delta x_o$ will detect wavefield amplitudes other than at integral multiples of Δt. Hence for such case, space-time variable operations developed from the Wave Equation will effectively treat samples in time smaller than Δt owing to the coordinate coupling. For the case shown, when Δx=½$\Delta x_o$ the effective time sampling would be in fact precisely half that computed using signal theory in normal manner for time sampling using Δt.

It should be evident that more complex wavefields and/or antenna geometries with or without discrete spatial sampling will rapidly lead to irregular sampling of wavefield amplitudes in the time variable. Such samplings are not readily addressed by signal theory except on a case-by-case basis. Alternatively, space-time coupled formalisms derived from the appropriate wave equation enable us to fully use the sampled wavefield information content by reconstructing the wavefield in each variable beyond the Nyquist limits as normally defined for the individual variables when they are addressed separately, provided that the image sampling is adequate to represent such information.

Approaches as described nevertheless embody sensitivities to a number of practical considerations. Certain limitations will be introduced by the accuracy with which wavefield geometries and antenna functions are known. Also, the specification of the velocity function and any related errors involved will play an important role regarding the intended application. Indeed, the real sources which develop the wavefield must also be considered.

Returning to FIG. 1 one can make still one additional important observation. As previously stated if Δx for a discrete sampling of the antenna function is greater than $\Delta x_o$, while time samples other than at increments of Δt will occur, they will be inadequate in their number or better "density" to represent frequencies of the time variable up to the Nyquist limit corresponding to Δt. For applications where recovery of such frequencies is required, two alternate options can be undertaken either singly or in some combination. It will be noted again that for either approach as will be described, a coordinated use of computations involving both the space and time variable is necessary to attain the sampling objective.

Holding the antenna function fixed, one can record differing wavefields having the same information required. For example, one could generate such wavefields having differing θ values (or geometries, etc) if this proves practical. The effective density of time samples can be increased to an adequate level or even greater number by then amalgamating the various wavefield samplings via space-time Wave Equation operations. As an alternative, we may use more than one antenna function for a single wavefield. Changing the sampling as well as geometry qualifies as distinct antenna functions in this context. Of course, both procedures can be applied in some combination as may prove appropriate for differing applications. Using both methods in combination has been a fairly standard technique for the seismic reflection method under certain constraints. With the present invention, it has been found that wavefield sampling in the manner herein described can access the wavefield information structure beyond limits normally considered possible.

A specific example applying the principles cited as well as some yet to be presented would be instructive but before this is addressed, it is important to understand the nature of a wavefield reconstruction approach which derives from the Wave Equation as distinguished from other methods which are often applied to wavefields and which also use multiple variables. There remain as well, other important dimensions of wavefield information content which are not recognized, and these must be introduced to complete an appropriate background discussion.

3. Linked Variable Wavefield Reconstruction

The Wave Equation in its various embodiments: acoustic, elastic, electromagnetic, etc., describes wavefields in terms of their space and time coordinates and includes those conditions which govern the particular circumstance. Most effective wavefield reconstructions are developed either from the Wave Equation itself or one of its more general solutions. More typical formulations based on the Wave Equation involve discrete approximations which are then convenient for handling using digital computers. Those approaches which start with general solutions to the Wave Equation are usually also discrete, and again seek to take advantage of modern computing capabilities.

For the sake of completeness and to provide additional insights it is helpful at this point to introduce the Wave Equation itself. Since the case studies to be presented involve the seismic reflection method, a simple form of the Wave Equation will be presented using cartesian coordinates x, y, z:

$$\frac{\partial^2 \phi}{\partial x^2} + \frac{\partial^2 \phi}{\partial y^2} + \frac{\partial^2 \phi}{\partial z^2} = \frac{1}{V^2} \frac{\partial^2 \phi}{\partial t^2}$$

The quantities named in the Equation above are readily identified with x, y, z and t being the usual spatial and time coordinates. The Velocity Functions V may vary with all of the above independent coordinates. In this case φ describes the propagating disturbance and represents wave displacement (dilation, pressure, rotation, etc.)

Since both spatial and time variables are involved, computations even using modern computing systems can be particularly onerous. Hence, it has become a fairly common practice to "decouple" the space and time variables in some manner as we previously noted. This is usually done by application at some point of a Fourier transform in which the solution to the Wave Equation is addressed one independent frequency component at a time. It has been found, however, that this widely accepted approach has resulted in a significant information loss. Instead, with the present invention, one can sample and reconstruct propagating wavefields using Wave Equation-based methods which involve treating space and time variables simultaneously. The added arithmetic burden of using it, however, is one aspect of attaining the additional information sought. Another aspect is applicant's discovery that the resolution of the image is limited only by the wavefield sampling, and not by the sampling of individual variables nor parameters which describe the real source.

All wavefield sampling is done over the time variable t as well as the spatial variables. Most imaging applications, however, are desired as functions of the spatial variable only. Clearly then the sampling over time must ultimately represent sampling over distance for satisfactory imaging. While velocities appear to be a simple means of rescaling time as distance, the relationship is anything but simple. Indeed, a wavefield value or amplitude at any time is quite ambiguous in its physical significance. It may derive from any of a number of different locations wholly or in part from several of these.

Many of the numerical solutions to discrete approximations of the Wave Equation are in fact linked variable computations. Such approaches fail to achieve the full information potential of the wavefield sampling because the variable increments preassigned are too coarse to represent the full resolution. Such choice of the computational grid is, of course, made on the basis of essentially conventional sampling theory criteria which according to the present invention have been recognized as being inappropriate.

The sampled wavefield grid and the image grid then, while employing variables having the same names, are in fact not simply related. In this instance, the physics embodied by the Wave Equation in conjunction with the velocity function—which for some applications may vary in time—constitutes a transformation of a sort which can even be non-analytic. For this reason, comparisons of the wavefield sampling and image sampling does not have the same meaning as one might presume for a simple linear system.

It follows that the sampling of a wavefield at an antenna function may appear to have specified increments of the spatial variables and time, but the effective sampling of the propagation medium can be quite different. That is, when one accommodates the travel paths corresponding to such sampling recognizing also the origins of the wavefield, the density of the spatial sampling may be significantly greater than indicated by parameters of the antenna function and the time sampling increment. This notion will be further expanded when one considers sampling in wavefield reconstruction.

There are also, however, other computations often applied to wavefield related problems which involve joint use of independent variables. One of these for example is interpolation. It is important to appreciate that Wave Equation based operations as we require are readily distinguished from interpolation and other such operations. Specifically, a velocity function must be supplied and travel paths considered to relate Wave Equation variables in any analytic or non-analytic manner; whereas no comparable physical factors are required for interpolation or any of these other computations. Typical scaling operations for interpolation procedures involve only weightings based on proximity considerations in regard to the samples.

4. Relating Real and Virtual Sources

Wavefields emanate from real sources and propagate in appropriate media. We continue to adapt a viewpoint toward wave field reconstruction which differs from more usual approaches, but unifies most of the familiar ones. In fact, the philosophy as will be applied owes much to the philosophy of Huygens in which each element of a propagating wavefield may be regarded as a new source in itself.

Wavefield reconstructions may be used to image the wavefield itself including sources as well as the propagation medium. Most applications form images of either the source or the medium, and we shall show that these can be related quite simply. For our discussions it will be helpful to call sources, "real" sources. Also, the categories into which wavefield reconstruction applications are usually placed will be reformulated as a consequence of this revised perspective.

At this point one should shift consideration to the propagation medium. If the medium is uniform and homogeneous as well as non-dispersive and non-attenuative then its only property of consequence can be the wavefield propagation velocity. Should any property of the medium show variation, then the description or imaging of such property within the medium to some designated resolution and accuracy can be recognized as a task for wavefield reconstruction.

There are classes of wavefield reconstruction used which seek to image real sources whose wavefields are considered to propagate more or less undisturbed in a particular medium. Approaches of such type include Astronomy, Navigation and Passive Sonar Detection to name a few. Detail applied in the reconstruction can vary from simple measurement of a travel time or distance, to a refined image of the source identifying specific properties pertaining to it.

Huygens is credited with developing the insight whereby a propagating wavefield can be synthesized by treating each of its elements as an independent radiating source and noting the effective envelope of propagation for such sources. One can then extend the significance of Huygens' principle by considering the wavefield to be propagating within some material.

If one now considers a single resolution element within the medium one is seeking to image, then for any real source wherever it is positioned, this element may be considered in the spirit of Huygens as a new source, but now of virtual or apparent nature. It might even be called a Huygens' source in respect of this extended view. All of these names may be considered interchangeably. One might appreciate at once that the virtual source differs significantly from a real source in that it does not radiate a wavefield unless a real source is also present. Indeed, its effective properties are directionally dependent and derive from properties of the real source and its proximity to that real source.

A wavefield from an apparent source can be sampled by an antenna function as if it were a real source. We must in any wavefield reconstruction procedure also accommodate the existence of the real source as well, which is usually a rather straightforward matter. It is interesting to note that if the real source and antenna function tend to be on one side of the resolution element we might term such application a "reflection" technique. Similarly, if the resolution element lies between the real source and the antenna function, we might term the approach a "transmission" method or perhaps "tomographic" application. All of these applications which we regard as distinct, are a continuum of implementations of wavefield reconstruction for imaging an apparent source. Only the imaging of a real source is clearly different.

When we do image a real source, what one sees is what one gets—so to speak. That is, the size and shape, signal character in time and space are all that any, or even the best imaging can recover. Of course the considerations previously noted concerning wavefield sapling continue to apply whatever the application. Any limits in time or spatial frequency inherent to the real source fully govern what is attainable as an image. This fact has become a guiding paradigm for essentially all imaging and wavefield reconstruction methods. It is interesting to see, however, that characteristics inherent to the real source do not correspondingly limit how we may image a virtual source. While this statement may seem remarkable at first, its accuracy is easily demonstrated with an intuitive argument.

Suppose only a single distinct resolution element exists in an otherwise homogeneous or ideal propagation medium. It must always have some effect on a propagating wavefield whatever its properties. Detecting such an effect may be difficult, but it is always only a matter of "numbers." One can overwhelm noise and small size by sheer statistics if one wishes to do so. In fact, there are interesting choices available for accomplishing such a task. As discussed earlier, one may employ more and better antenna functions as well as many sources. If one is determined, available technology should allow one to achieve any imaging goal in terms of accuracy and resolution for most cases. Hence wavefield reconstructions which image virtual sources offer perhaps the most powerful imaging technology yet developed owing to the flexibility in implementation as well as the nature of results which might be achieved. It is important to point out that in detecting a small effect or resolution element, the sampling of the variables if any must be capable of such representation according to the usual criteria of sampling theory.

From another view, what we have described is unremarkable as well in that holographic imaging using monochromatic radiation of the electromagnetic spectrum produces images having time and spatial frequency content differing from that of the source illumination. Of course this technology again fully exploits wavefield properties to achieve such objectives.

5. Imaging Virtual Sources—Huygens' Imaging

One should recognize that in adopting the view of imaging virtual sources some basis for a directional dependence of the effective wavefield becomes quite apparent. For example, in the case where the virtual source lies between the real source and elements of an antenna function, the wavefield recorded will of course represent an interference between the wavefield from the real source and the Huygens' contribution from the apparent source.

It will also follow that all methods of wavefield reconstruction for imaging a virtual source must accommodate two reference locations. The most straight-forward of such approaches would of course consider as reference locations the real source and a particular resolution element acting as a virtual source. Requirement for two reference locations leads many wavefield reconstruction approaches as variously applied to define surfaces which are conic sections, typically ellipsoids and hyperboloids of revolution. Before illustrating such cases, however, one should note that wavefield reconstruction methods involving use of surfaces for computational reference are typically called Kirchhoff methods in many applications (optics, exploration seismology, etc.)

Early work by Kirchhoff demonstrated that an integral over a closed surface encompassing real sources could fully represent the physics of the propagating wavefield. Hence imaging methods using surfaces derive their terminology as Kirchhoff methods essentially by analogy. A more proper nomenclature in the same tradition would be to call them Huygens' methods although this approach extends Huygens' ideas as has been indicated previously.

Figure 2:
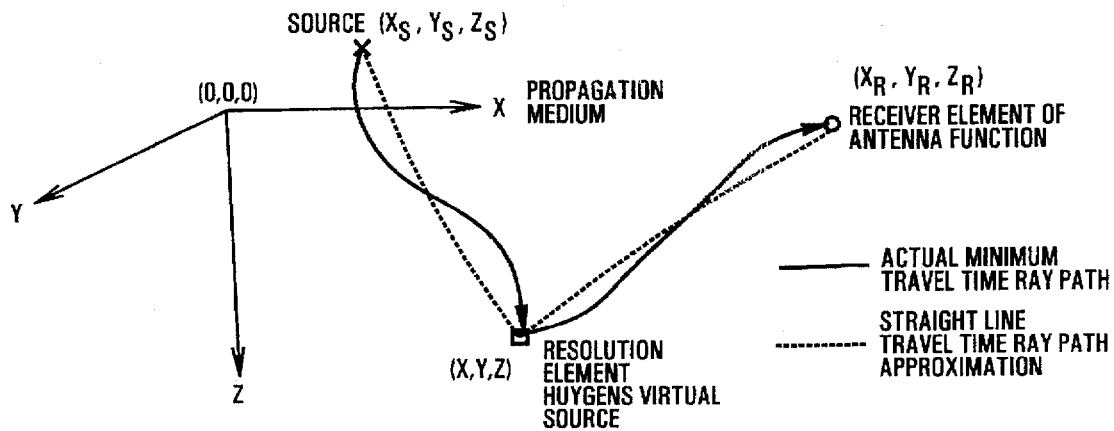
FIG. 2 is a schematic three-dimensional diagram showing minimum travel-time paths and straight-line approximations for a real source to a particular resolution element and on to a designated receiver element of the antenna function.

Returning now to formulating a representative wavefield reconstruction in a most elementary case, one can consider only a real source and a single resolution element acting as a virtual source. The antenna function must now be included and in particular consider detecting the wavefield at one location of such function. FIG. 2 shows a general case where the key elements are seen in a propagation medium having varying properties so the minimum-time raypaths shown are not drawn as straight lines. Straight lines are also shown by way of recognizing them as approximations.

Note from FIG. 2 that the total travel time involves a sum of two contributions—from the real source to the apparent source and from the apparent source to a particular detection point of the antenna function. This becomes an important consideration as a matter of establishing a preferred calculation for the reconstruction of wavefields.

A right-handed Cartesian coordinate system is indicated in FIG. 2 as well. Coordinates are provided for key elements shown with the subscripts s and r denoting the real source and the particular receiver element respectively. The total travel time as approximated by the straight-ray paths is simply a sum including two terms as follows:

$$\frac{1}{V_s} \sqrt{(x_s-x)^2+(y_s-y)^2+(z_s-z)^2} + \frac{1}{V_r} \sqrt{(x_r-x)^2+(y_r-y)^2+(z_r-z)^2}$$

where $V_s$, and $V_r$ describe some "effective velocity" for each of the two parts of the total travel path.

It is not necessary to put any particular constraints on the antenna function either in terms of continuity or geometry. Nevertheless, one can readily conceive of a very simple statistically based approach to imaging a designated virtual source which one may also think of as a Huygens' source. It is, of course, required that one have a reasonable estimate of travel times for each element of the antenna function for each real source employed to illuminate any virtual source of interest. There may or may not be many real sources just as we may employ some multiplicity of antenna functions. Then, one may identify all amplitude values at least partially pertaining to that specific virtual source by their arrival or travel times and sum them all. That sum in a zeroth order sense then represents the image we seek by selective reinforcement of the desired response and cancellation of other contributions. Of course, some "normalization" which takes account of the number or span of the summing operation is needed as a practical matter.

The procedure just outlined does not necessarily involve surfaces in any general implementation. It is evident also that the ultimate resolution attainable—i.e., the number and size of virtual sources to be imaged depends on the number of independent samples of the wavefield acquired which can act to describe the propagation medium. Clearly, reliability of virtual source images increases as the ratio of independent wavefield samples to the number of virtual sources increases. This ratio is a measure of data redundancy. Having large data volumes is the approach most often applied to recover small amplitudes or to detect wavefields in higher noise environments.

Figure 3:
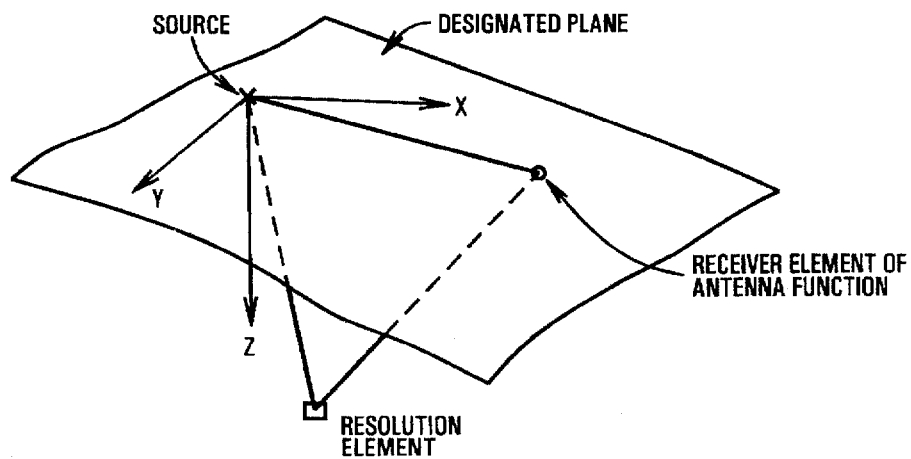
FIG. 3 is a simplified schematic three-dimensional diagram in which a real source is at the origin of a Cartesian coordinate system and a designated receiver element of the antenna function lies in the plane z=0. Straight ray travel paths to a particular resolution element are also shown.

Simple surfaces for the summation can be defined for special cases where the locations of real sources and receiver elements within the antenna function are in some way constrained. For example, if we place all real sources on a planar surface and take the antenna functions to be some sampling of this same plane then the sum we have sought to form will be governed by travel times (straight-ray paths) according to the expression:

$$\frac{1}{V_s} \sqrt{x^2+y^2+z^2} + \frac{1}{V_r} \sqrt{(x_r-x)^2+(y_r-y)^2+z^2}$$

where the real source is now the coordinate origin (see FIG. 3).

If now $V_s$ is taken to equal $V_r$ and the resolution element or virtual source also lies vertically below the coordinate origin, then the travel time expression becomes:

$$\frac{2}{V_s} \sqrt{x^2+y^2+z^2}$$

Imaging by summing constrained in this way, using a more or less regularly sampled antenna function over the designated plane, defines a sampled space-time surface which is an hyperboloid of revolution. It is also a method employed for seismic imaging known as the Kirchhoff Diffraction Stack.

It is interesting that the wavefield reconstruction approach just described is essentially unbounded in that x, y, and z may arbitrarily increase to any value. This "open-ended" nature is a strong reason which leads one to seek out some alternative method which does not sham this feature and which also has additional advantages. In seismic applications again, and also with appropriate constraints, this would be considered another Kirchhoff method but in fact we note this terminology is quite imprecise. The methods which are being considered should more properly be called Huygens-type approaches for reasons previously explained and yet still keeping with industry traditions.

Assume once more that travel times from any real source to a designated resolutions element are known, as are the travel times from such element to any element of the antenna function. A different approximate wavefield reconstruction procedure for imaging the apparent source representing the resolution element desired may be designed starting as before with a particular virtual source and the real source. One now can take the real source in conjunction with a particular receiver element of the antenna function. In continuing this discussion one should refer now to FIG. 4.

Figure 4:
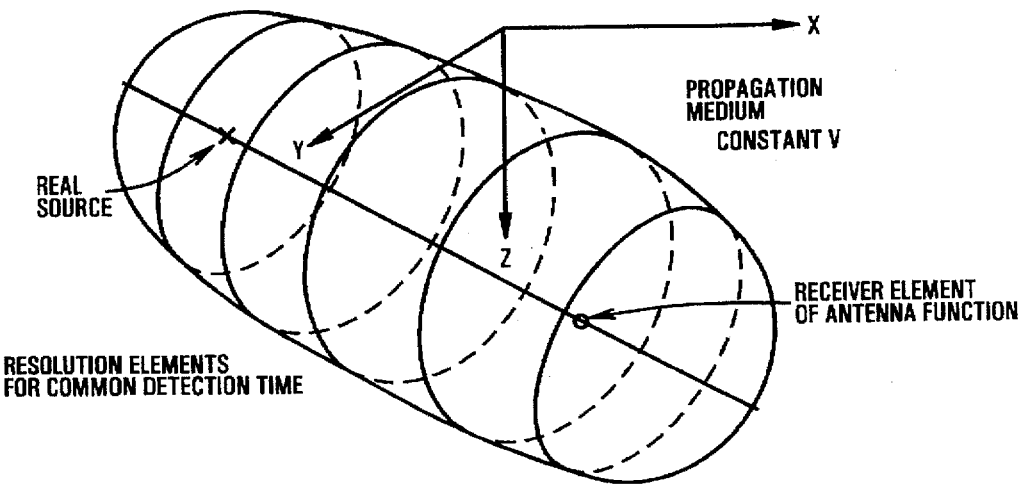
FIG. 4 is a schematic diagram showing the locus of all resolution elements having a common total travel time for the real source and particular receiver element of the antenna function for a constant velocity propagation medium.

For FIG. 4, in order to simplify the drawing, the propagation medium surrounding the real source and receiver element is taken as a constant as are all other relevant material properties. For any fixed total travel time value, any resolution element or virtual source which might contribute to the detected wavefield amplitude will have a locus lying along an ellipsoid of revolution as shown. This follows from the geometric definition of such a surface, if now the real source and a particular receiver element are taken as at the two foci. This surface is closed and thus clearly limited in the range of variables which must be considered. Obviously, once material parameter changes are included the counterpart surface would have other form of greater complexity.

It is also clear that complex antenna functions may even preclude any description of the collective positions of virtual sources which might contribute to the detected wavefield amplitude as constituting a surface of any kind. Nevertheless, the imaging approach as applied distributes the detected amplitude at every defined resolution element from which it might have come. If a sufficient number of real sources and/or receiver elements is employed in such manner and similarly distributed, then the propagation material can be imaged to any desired resolution by the reinforcement of the valid information.

One should point out that computational normalizations can be readily designed for this approach, and these would accommodate wavefield spreading since the total travel time is common for each detected amplitude undergoing the distribution process. Also, the velocity function is known. In such way, the image formed can have even greater fidelity.

Note that the number of resolution elements over which the detected amplitudes are to be distributed depends only on the number of independent samples which are available. Factors which limit resolution are of course accuracy of the velocity function and travel times, signal/noise levels, real source characteristics, as well as analogous practical matters.

In the preferred computation the method just considered will be applied, but allowing also for a different velocity to be applied for wavefield travel from the real source to the Huygens' source or resolutions element, and from the resolution element to the receiver element. The actual computation sums one-way travel times for the real source and receiver element travel time components to develop two-way travel times for the resolution elements as functions of real source-receiver element pairings. It is then a simple matter to substitute amplitudes as detected and recorded for the particular pairing corresponding to such two-way travel times. A detailed expression of such computation will follow in the context of the illustration using actual data.

It is important to recognize that the methods described other than the preferred computation are commonly applied in many applications involving wavefield reconstruction and imaging. The essence of this invention is the appreciation that both the wavefield sampling and attainable imaging resolution for virtual sources are not bounded nor related as implied by traditional paradigms. It is the extended Huygens' approach to imaging which clarifies the second consideration. All considerations following from this invention make clear that data as acquired for traditional approaches to imaging have significant information potential beyond that which can be realized by usual approaches.

6. The Roles of Sampling in Wavefield Reconstructions

Those methods offered for Huygens-type imaging of virtual sources in fact constitute linked-variable wavefield reconstructions since travel times are related to the spatial variables. They also properly account for the role of sampling. Since several concepts of importance are interacting for all wavefield reconstructions one can offer here an intuitive guide to the distinctions which are made, to be followed subsequently by the practical computation illustrating advantages offered by the present invention.

Figure 5A:
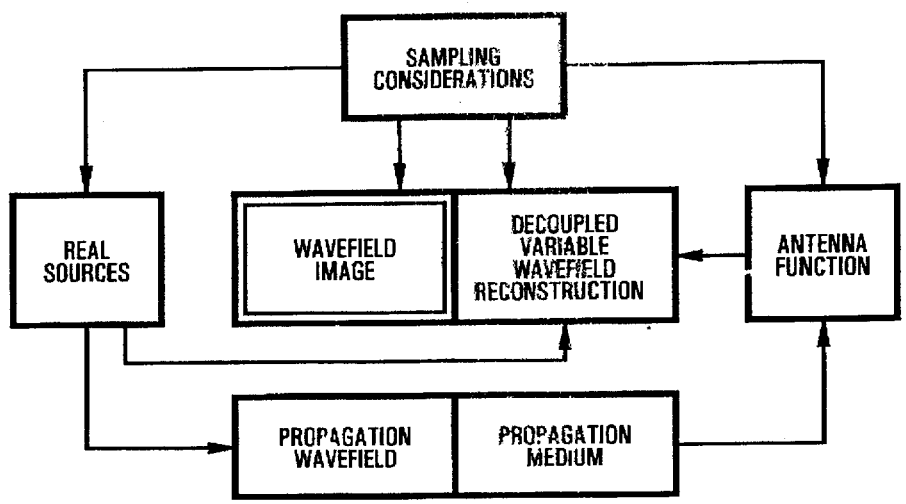
FIGS. 5A, 5B, and 5C are schematic diagrams of the interrelation between various wavefield imaging concepts and sampling of the variables.

FIG. 5 presents in diagrammatic form three alternative philosophies of wavefield imaging which clarify the differences to be emphasized. In FIG. 5A, the principles of sampling are applied independently to real sources, the antenna function, the decoupled wavefield reconstruction as well as the wavefield image. Resulting wavefield images even for virtual sources are then deemed subject to effects such as aliasing, limitations based on real source frequencies and other properties, as well as Nyquist limits to resolution. This is perhaps the most usual form for wavefield imaging application at present.

Figure 5B:
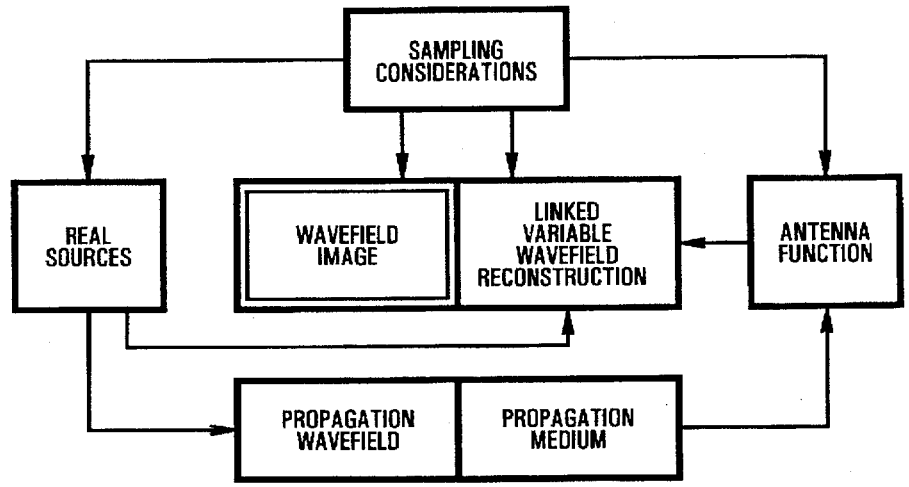

In FIG. 5B, wavefield reconstruction uses a linked-variable approach, but now sampling considerations again are inappropriately and unnecessarily applied as in FIG. 5A. Limitations as perceived for FIG. 5A are believed to apply—they do not. This is becoming a more common circumstance in several wavefield imaging approaches.

Figure 5C:
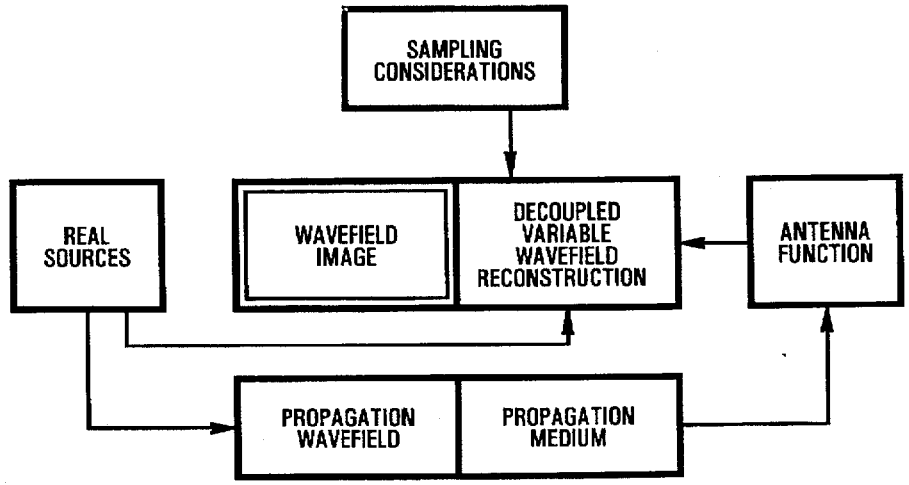

Only FIG. 5C indicates a correct role for the sampling consideration. Wavefield image resolution limits for virtual sources depend only on the number of independent samples which are available as well as uncertainty in the system (positions, velocity, etc.) and of course signal/noise levels. The designated sampling which defines the resolution of the wavefield image must be both adequate to support the objective resolution yet also have adequate information support from the wavefield sampling.

Since the recorded wavefield samples are taken over the travel time variable, it is also common practice to form images using this same variable. Having in hand a velocity function makes it possible to accomplish imaging using only spatial variables. There is almost always considered to be some error associated with an estimated or even measured velocity field, hence many feel it preferable to image using the travel time variable. It is especially important to realize that a wavefield image which uses the time variable is in fact actually described properly by distance variables; the travel times in this case represent some effective and continually varying rescaling of the distance but as related to the travel paths.

The importance of the view just expressed becomes highlighted if one seeks to use the Fourier domain to assess information content as is often done in signal theory. If, for example, a real source has time frequency content in a band $f_1$ to $f_h$ representing low and high limits, then the wavefield sampling in the corresponding time variable is typically spaced using such knowledge to accommodate the necessary frequencies according to Nyquist theory. In fact, the resolution attainable from the wavefield sampling taken in its totality may allow much finer sampling.

As indicated, the image is formed in consideration of the spatial variables by noting the actual travel of the energy in some approximation during linked-variable wavefield reconstruction. A travel time scaling of a spatial variable thus can be finer than the travel time sampling of the original wavefield sampling. Thus, it becomes possible in evaluating time variable frequency content along an image using a time variable to detect frequencies which appear to be outside the band encompassed by the real source. Such frequency is an apparent frequency but nevertheless has significance in physical terms.

An apparent time frequency outside the bandwidth of the real source becomes some measure of the enhanced resolution of the wavefield image over that deemed attainable using Nyquist criteria and the original wavefield sampling. Since the relationship between the travel time and the spatial variable can be quite complex, more specific meanings can only be established on a case-by-case basis. Note again that in the various discussions here the term frequency is often used interchangeably with wavenumber. The context in each circumstance should make the meaning clear. In this regard and for reasons which have analogs as above, apparent wavenumbers again outside those deemed reasonable using Nyquist principles applied individually to the independent variables of the sampled wavefield will also be encountered. One may now note some results.

7. A Seismic Reflection Imaging Application

To demonstrate what has been described one can perform wavefield reconstruction using linked variables to image a propagation medium—the earth, in terms of acoustic impedance below a profile of seismic soundings. While this is a two-dimensional application involving a three-dimensional subsurface there will be no loss of generality. One can show imaging with resolution beyond the Nyquist time frequency limit for the data acquired and reaching apparent time frequencies one would not reasonably expect to be present with significance in the real source according to current prevalent paradigms. At the same time we will show a preferred embodiment for performing such calculation which is readily extended to three dimensions.

Figure 6:
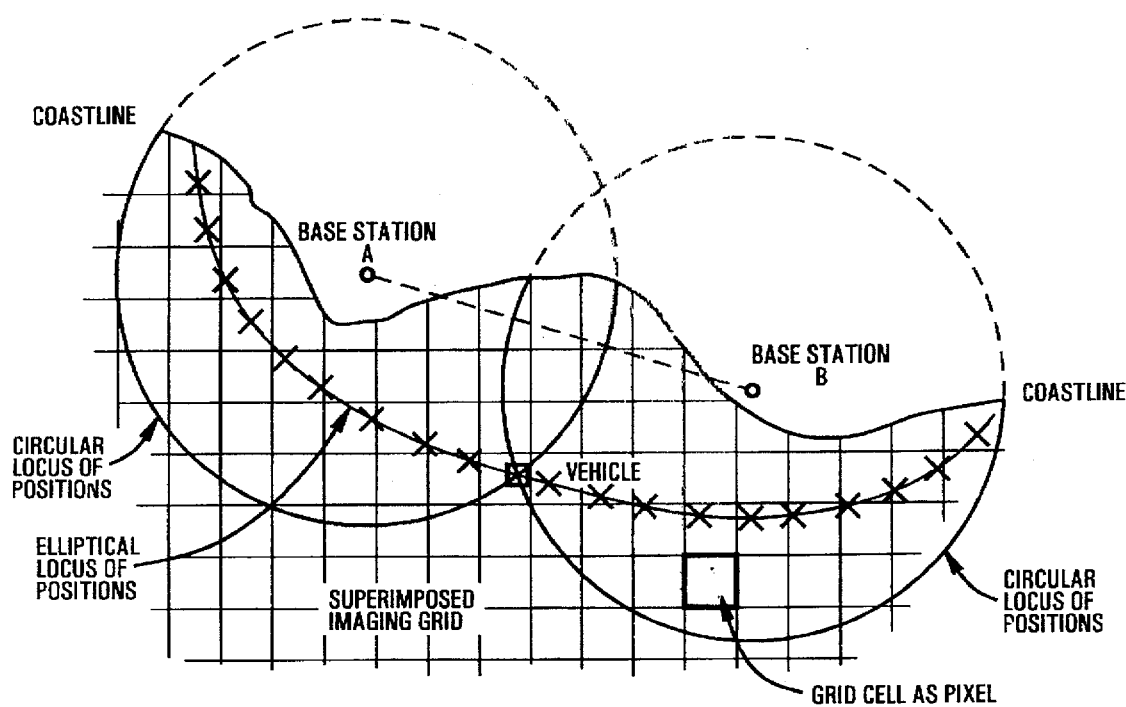
FIG. 6 is a schematic diagram relating the present invention used in connection with navigation or object positioning and location.

The second method of Huygens-type imaging as previously described (and illustrated for simplified conditions in FIG. 4 as an ellipsoid of revolution) will be implemented. This preferred calculation also involves a computational "trick" or algorithm which can be explained rather easily in terms of a perhaps another more familiar wavefield imaging application—Navigation using two base stations. FIG. 6 shows a vehicle one is seeking to position in a plane with two base stations, A and B, transmitting discernable electromagnetic signals at known velocity in air for the vehicle to receive.

If reference times for initiating the signals at A and B are available, the vehicle will measure travel times of $T_A$ and $T_B$ from the two base stations. Using the signal velocity and a good map, circles of appropriate radii can be drawn about each base station. Their intersection over the water in FIG. 6 locates the vehicle in relation to the base stations. All of this as shown, is of course, simple triangulation.

Suppose now base station A transmits a signal, but base station B receives an echo or reflection from our vehicle in order to position it. The reflection has a signature over time representing amplitudes but there is only a single measurement—insufficient to locate the vehicle. One can only say that the vehicle lies somewhere along an ellipse over the water having base stations A and B as foci. If one used many base station pairings analogous to A and B one would position this vehicle by intersections of ellipses similar to triangulation, but now using ellipses in place of circles.

To develop an image of the vehicle rather than just its location for the navigation approaches being considered, one need only distribute amplitude recordings as made over the circles or ellipses (See FIG. 6). One could superimpose a grid over the area as also shown in FIG. 6 and this act of amplitude distribution might simply consist of writing a time history of amplitude in each "grid cell" or "pixel" closest to the particular curve being used. The grid is also indicated in FIG. 6.

If the amplitude measurements are arithmetically added into the grid locations one would position as well as image the vehicle by noting the final amplitudes appearing in the various grid cells. The size of the grid cells which are to be chosen have relation now both to the positioning of the vehicle as well as its imaging. There must be a sufficiency of measurement trajectories through the grid in order for the true image (correctly positioned) to distinguish itself from the amplitudes as elsewhere distributed and this is a fundamental requirement of the invention. Also, the resolution of the image will depend as well on the size of the grid cell selected and all factors as previously identified which play a role in such process.

Before examining the reflection seismic application one should look again at the navigation case involving the ellipse. Calculations using ellipses usually involve significantly more effort than those using circles. Also, one can add a substantial level of complexity to the situation if the travel times from base stations A and B respectively to the vehicle require different velocities. For such instances, what had been an ellipse for equal velocity functions would become some other curve having dependence on the differing velocities. The computations needed now take on extraordinary requirements taxing even the largest and fastest computers currently available. Even when fast and large computers are available, however, one is always still interested in computational efficiencies.

Figure 7:
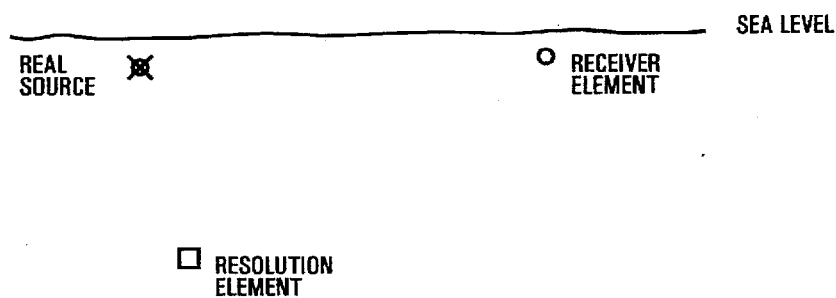
FIG. 7 is a schematic two-dimensional diagram illustrative of the present invention used in connection with a seismic reflection survey of the subsurface.

The seismic reflection situation which is indicated by the simplistic sketch of FIG. 7 has much in common with FIG. 6. The plane of FIG. 7 unlike that in FIG. 6 stands vertically rather than horizontally. A real source acting as counterpart of base station A transmits a wavefield. One seeks to image the particular resolution elements counterpart to the vehicle of FIG. 6. One knows these resolution elements are also virtual or apparent sources or Huygens' sources, and these have been predetermined in size and number to establish the image. In making such choice one must be assured that the amplitude distribution operation to be performed provides adequate entries in each grid cell. This is done in order for the statistical benefits which are assumed to apply, and to form resolved images at the correct locations.

It is now very possible in this seismic application, even likely, that travel times from the resolution element shown to the real source and a particular receiver element of an antenna function will travel with different velocities. One would wish to have some appropriate means having computational efficiency to accomplish the Huygens' distribution operation while at the same time recognizing in some manner the differing velocity functions which must apply.

One can take the real source position and use its velocity function to calculate circles representing only one-way travel time. Correspondingly, one can also take the receiver element position and use its distinct velocity function to again calculate now different circles of one-way travel time. Referring to FIG. 6 which was first discussed for the navigation application, note that the circles shown actually indicate one-way travel times just as is being suggested at this point for the seismic case. Hence as was proposed earlier, one may consider this same figure but representing a vertical plane as again depicting the reflection seismic imaging case as well as the navigation application.

As indicated, one can propose a departure from the straightforward imaging methods previously described. All of these had in common the operation of adding amplitudes into the grid cells. Instead, one can add the one-way travel times into the grid cells shown. For any one source-receiver pairing (A and B in this case), the sum in any grid cell which is also a resolution element in this extended Huygens' imaging scheme would clearly be a two-way time since it incorporates both legs of the travel time from A to B.

Imaging operations require, however, that the grid cells contain amplitude values rather than travel times, but obtaining them is a now quite a simple matter. Considering a receiver element at B and the real source at A, the recording is in fact a time history of amplitudes at B in two-way travel times. For the A and B pairing under discussion, one may go to the grid cells having two-way travel times from the previous operation and substitute the recorded amplitudes counterpart to the two-way travel times. If the velocities at A and B as they apply to the particular resolution element (vehicle) are the same, it is evident that the distribution of amplitudes as accomplished according to such method would be along an ellipse through the grid cells as is seen in FIG. 6.

Since the calculation described involves just one particular real source and receiver element pairing, it is clear that one will need a "master grid" in which the final image would be developed as well as a "working grid" into which the results for each particular source-receiver pairing would be computed. Results from the working grid would each in turn have to be transferred to the master grid by addition. Each grid, whatever its use must have the capacity according to the principles of sampling theory to represent the image as specified.

The added efficiency in this preferred computation derives from the fact that the circles of one-way travel time centered at each real source or receiver element need be computed just one time, and only when the velocity function of time associated with the particular ground location is different. For the one-way travel time summing operation, one simply superimposes by addition two one-way travel time grids of values spaced appropriately for the particular real source and receiver element and, makes the substitutions to amplitudes using the recording for that particular source-receiver pairing. Amplitude values so derived are then transferred from the working grid into the master would gain by summation.

Figure 8:
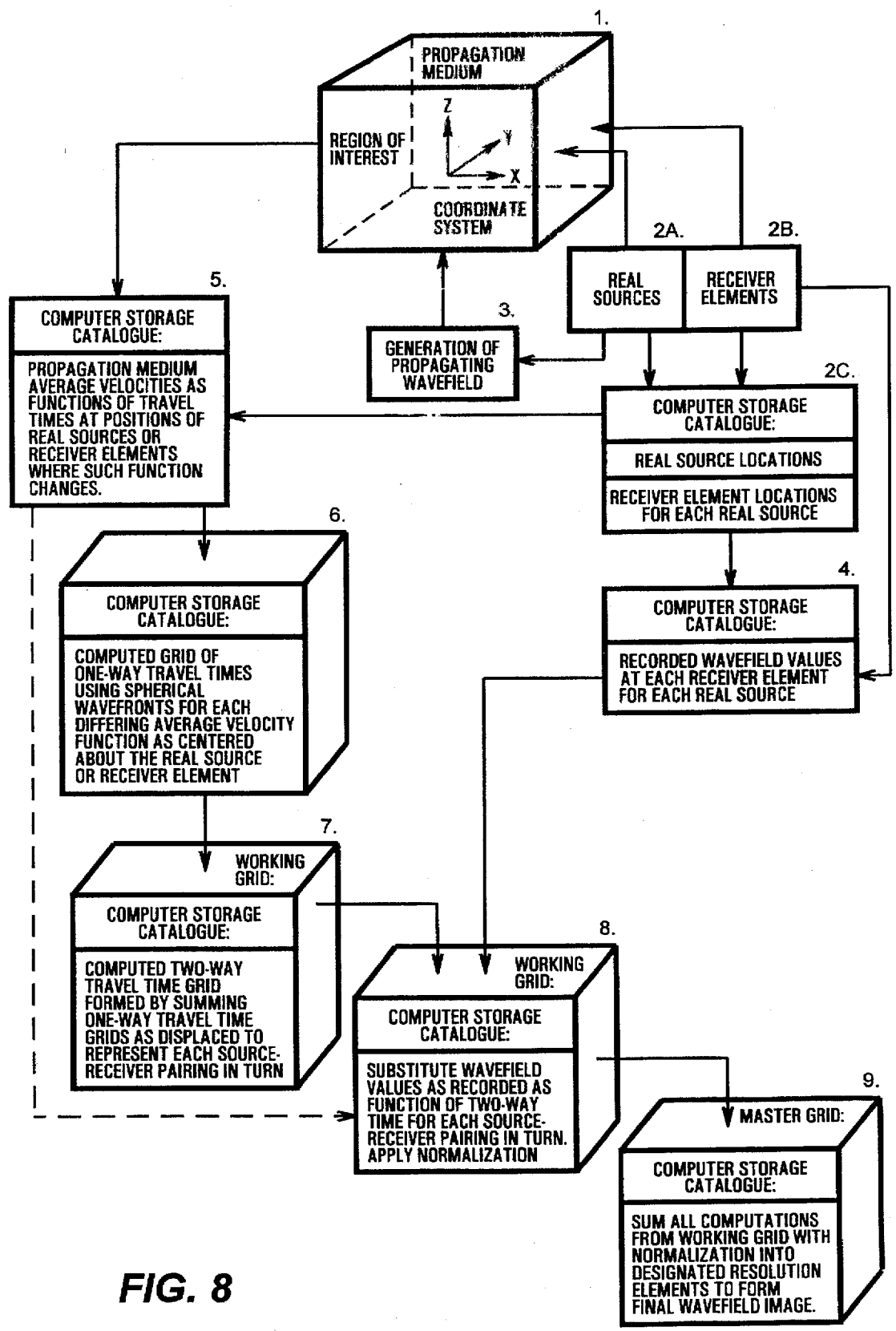
FIG. 8 shows a diagram indicating computing and data storage aspects of the preferred embodiment for a general three-dimensional case.

It would be particularly instructive to explain the preceding computation via a diagram since other figures as used to assist the discussion including FIG. 6 emphasize the physical situation. FIG. 8 seeks to clarify the calculation of the preferred embodiment for a full three-dimensional circumstance including storage requirements.

Nine numbered elements are noted in the schematic flow chart of FIG. 8. The propagation medium or better a portion of it over which imaging is to be undertaken is shown as Element 81. Element 82 via its components (82A, 82B and 82C) represents the real sources, receiver elements and their physical locations as stored for computational purposes. Note that it is important to recognize which receiver elements are active for any particular real source. Element 83 is not a part of the computation but expresses the generation of propagating wavefields in the medium which will form the basis for the imaging.

The master grid of Element 89 is the computer storage area in which the final image will be formed. Its resolution in spatial variables and time sampling is determined according to the principles of this invention, being independent both of the real source frequency content and sampling theory considerations as applied individually to the independent variables. Note that a normalization operation forms a part of the final calculation and Element 89 shall be discussed again, but later in the order of its role in the computation. It was necessary, however, to introduce Element 89 early on however in order to establish the sampling intervals which will ultimately be used as calculations proceed.

Recorded wavefield values for each receiver element for each real source are accessible to the computing via Element 84. In Element 85, the velocity field of the propagation medium is approximated by average velocities taken to apply as functions of travel time only over spherical wavefronts centered at each real source and at each receiver element. These average velocities may be available initially only at certain real source or receiver element locations, but by using interpolation as necessary, such information may be made available for each such location.

Average velocities as are required can be computed from measured velocities or computed from available data as appropriate to the particular application. For the seismic reflection data study which shall be noted as a practical demonstration, one such procedure is described with more detail.

The grid of one-way travel times corresponding to Element 86 uses the same discrete sampling as the master grid of Element 89. These grid values each centered about a real source or receiver element location need only be computed for each real source or receiver element location where the average velocity as a function of time differs.

Each real source-receiver element pairing corresponding to a recording of a time history of wavefield values is stored as a time series via Element 84. At the same time, two corresponding grids of one-way times displaced spatially from one another representing the two locations are added into the working grid of Element 87 to develop a grid of two-way times from the same real source-receiver pairing. In this way, lateral change of the velocity in the propagation material are approximated by using differing average velocity functions at the real source and receiver element locations. At the heart of such approximation also is the use of spherical wavefronts in one-way time.

Since the catalogue of Element 84 relates two-way or total travel times to wavefield amplitudes, these may be substituted into the working grid of Element 87 to develop Element 88. Since it is well known that wavefield amplitudes diminish over time owing to travel time, a normalization factor should be applied to accommodate the amplitude effect of travel time. Average velocities may be incorporated in such correction as they are available in Element 85 hence the dashed connection between Elements 85 and 88.

The final image is to be contained in Element 89 where the contents of working grid 88 are to be summed in turn once correctly positioned in regard to real source and receiver element locations. Normalization in this step is based on the number of contributions summed into each grid cell or pixel so that the image represents a material property and not the density of sampling.

A prerequisite for effective imaging of a propagation medium as has been indicated is some reasonable knowledge of the velocity function. The image itself usually represents impedance variations which by definition include the propagation velocity. For example, acoustic impedance for the case of acoustic waves is just a product of density and velocity. If velocity is a component of impedance, it appears that knowing a velocity function in advance of imaging almost implies knowing the answer before addressing the problem. This is, of course, not the case. For the seismic reflection application to follow one may first address model data where velocities are known, and then progress to situations where this consideration involving determination of velocity must be applied.

8. Model Data Set

Figure 9A:
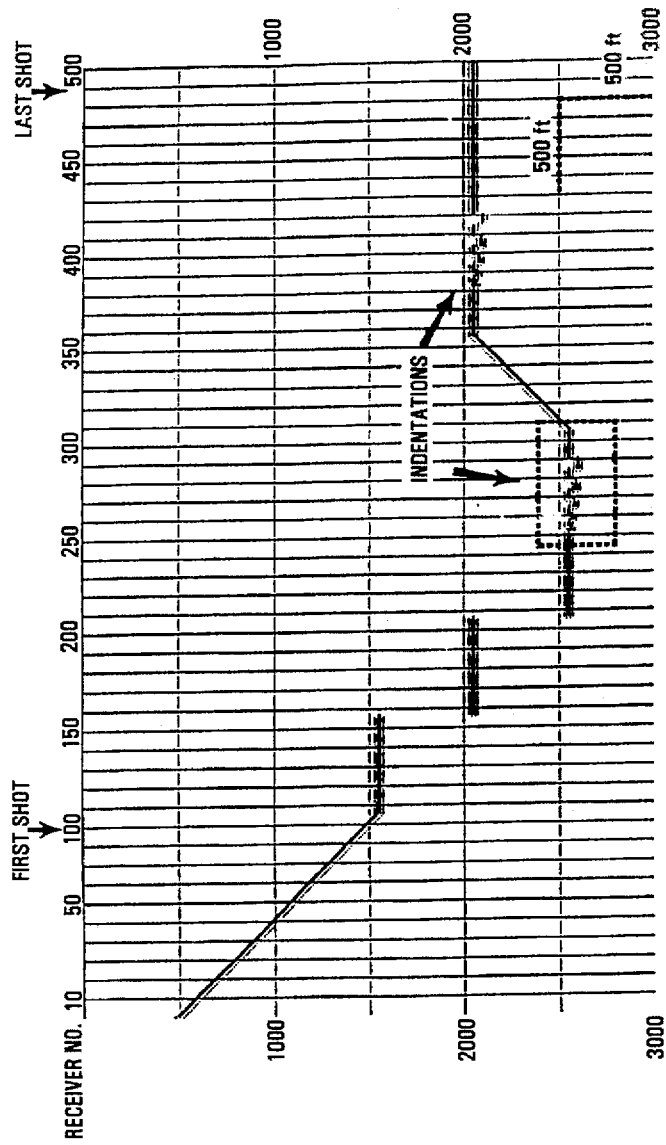
FIG. 9A shows a two-dimensional earth model from which simulated seismic data used for illustrating this invention is computed. Detail of the model is indicated in enlarged form at the bottom of the Figure.

Seismic data was simulated for a model shown as a function of depth in FIG. 9A. A numerical approximation to the elastic wave equation was employed with source and receiver element positions taken at the surface of this two-dimensional configuration. Positions along the surface have been annotated at 100 foot intervals. This model features two boundaries having 45° dips and several abrupt reflector "steps." Interest for this study, however, focuses on two of the horizontal reflectors separated in depth by 500 feet, each having a series of five indentations or "wells" which are also shown in enlarged format at the bottom of the figure. Each such well in the reflectors is basically square having a depth matching its width.

A constant velocity of 5,000 ft/sec was supplied for the calculation and the relatively broad-band seismic wavelet applied to mark reflections had a dominant and central frequency of 80 Hz. A full data set as generated consisted of a suite of 401 receiver elements recorded in time for each of 40 shots (real sources). The shots were spaced at 100 ft increments along the surface starting at the location marked. Receiver elements were spaced at 10 foot distances starting at that same distance from the real source. Time sampling was at 2 msec increments. For such parameters the smallest indentation or well (10 ft.×10 ft.) has two time samples describing its depth and two spatial samples if one images conventionally using the CDP methodology. The CDP imaging method is also described by Yilmaz, 1987 (Investigations in Geophysics, No. 2 Seismic Data Processing, Tulsa, published by the Society of Exploration Geophysicists) p. 45-47, and develops spatial sampling of the image at half the receiver element intervals. Hence, the smallest well would be seen with two samples in its spatial dimensions as indicated. According to the Nyquist criterion, the smallest well is approximately adequately sampled, at least at its dominant spatial and time frequencies.

Figure 9B:
FIG. 9B shows Huygens'imaging (through modified Kirchhoff migration) of the simulated seismic data from the model of FIG. 8A with and without the model superimposed.

FIG. 9B shows seismic imaging of a part of the deeper reflector with the indentations featured in the lower part of FIG. 9A. Huygens' imaging as described has been applied. Seismic specialists would say that a "prestack Kirchhoff migration" operation had been applied. The model superimposed on the migrated image is shown in the lower part of FIG. 9B. Even the 10 ft. well is readily identified.

Figure 9C:
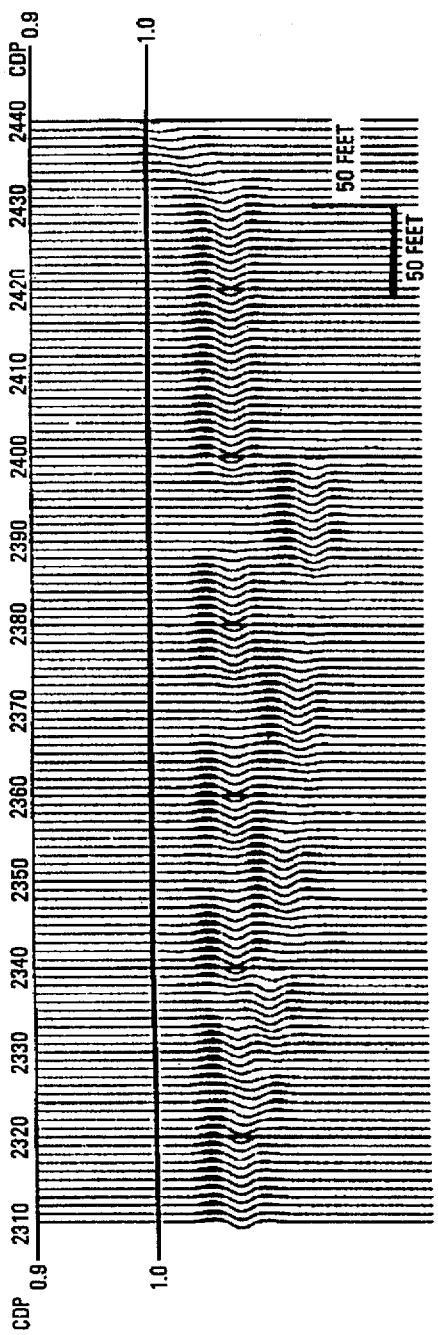
FIG. 9C shows Huygens' imaging (through modified Kirchhoff migration) of decimated simulated seismic data with and without the model superimposed. Only ten percent of the original data has been used. The decimated recordings retained for the calculations are indicated by the inverted black triangles.
Figure 9C:
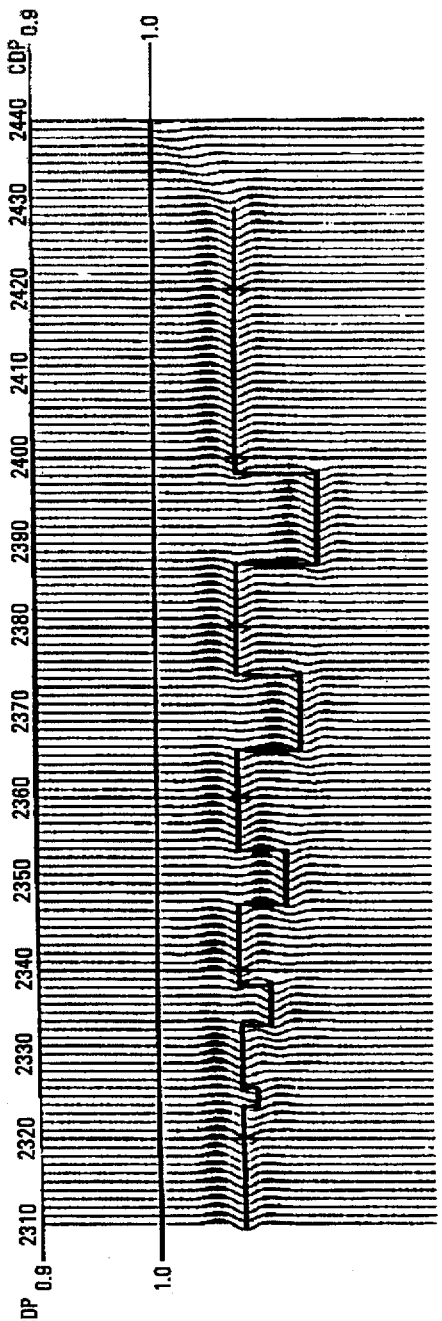

The display format as seen for both FIG. 9B and 9C is a standard used for seismic imaging known as "wiggle-trace variable area." A time history of amplitude values at each spatial sample is plotted vertically below its reference location as a curve about a zero level through the spatial sample position itself. Positive amplitude values swing to the right and are filled-in to the zero level with black coloring. This display is therefore "unbalanced" since positive amplitude swings receive more visual emphasis from the black coloration. Of course, in developing earth images, one expects a greater number of positive amplitudes representing positive reflections since acoustic impedances (both velocities and densities as components thereof) increase systematically with depth.

The basic recorded data set was then literally decimated in terms of the number of recorded receiver elements. Nine of every ten original recordings were deleted by replacing all recorded amplitudes by zeros. In all, only ten percent of the data as originally recorded has been retained with an effective shot or source spacing as well as receiver element spacing of 100 ft. A CDP spacing of 50 ft. follows and again following the guidance of Nyquist sampling theory one might reason that overall, the sampling was too coarse to image any of the wells except for the largest of these having 50 ft. size.

In the upper portion of FIG. 9C inverted black triangles mark locations where CDP imaging traces are available—at 50 ft. increments. Clearly, these spaced locations taken alone would miss describing the wells which represent the imaging objective. Interpolation can not recover the missing information adequately and processing methods such as decoupled variable migration imaging using Fourier Transforms again could not produce satisfactory resolution from such an input data set. Nevertheless, the linked-variable wavefield reconstruction as applied with 5 foot spatial sampling and 2 msec time sampling has developed an image quite comparable to the original computation shown in FIG. 9B.

In this case, the appearance of the smallest indentation or well for the decimated data clearly shows access to apparent spatial frequencies beyond those normally deemed recoverably from the effective spatial sampling. Such frequencies (or wavenumbers) are real in regard to describing the subsurface image space, but apparent in terms of their relation to the original wavefield sampling, especially as viewed from a conventional perspective in regard to the individual variables. Also, the dramatic reductions of data used with relatively little deteriorations of final image quality has clearly important implications for practical applications in terms of data acquisition cost.

9. Actual Seismic Data Set

A demonstration of the wavefield reconstruction (or prestack migration as seismic specialists would term it) according to this invention requires that the issue of obtaining appropriate velocity functions now be addressed. Hence, it is worth considering this matter with some generality prior to examining the field data seismic imaging results.

One can measure velocity in sea water as a function of depth (relating to salinity and temperature) prior to subsequently imaging submarines in this same medium as in the sonar case. For the reflection seismic application, the CDP method developed by Mayne (1962, Common-reflection-point horizontal data stacking techniques, *Geophysics*, 27, 927–938) readily allows for a "velocity" computation based on a synthetic aperture method and using a simplified model of the varying velocity field in the subsurface.

Figure 10:
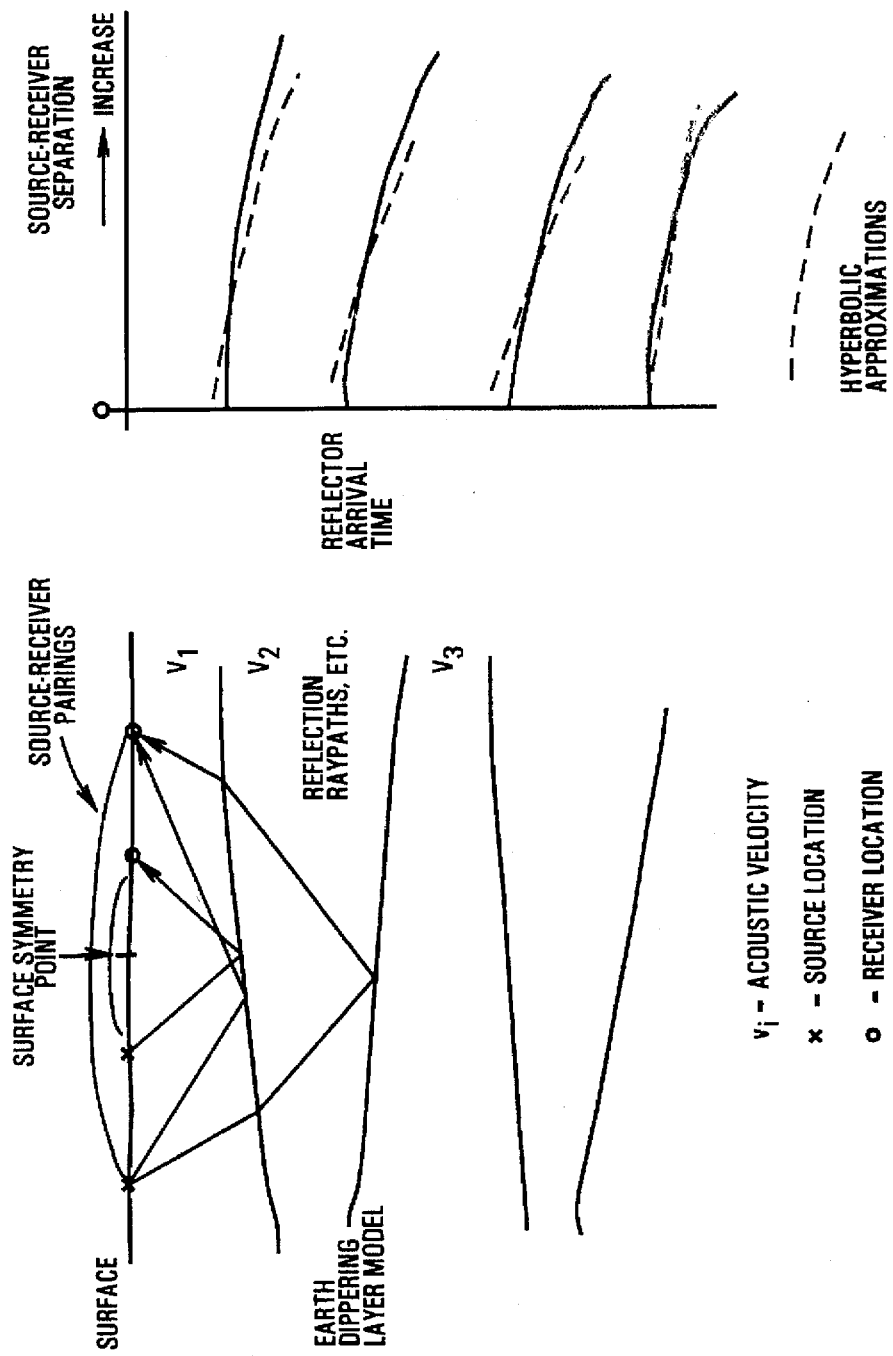
FIG. 10 is a schematic two-dimensional diagram showing that in a layered earth model arrival times for source-receiver pairings symmetric about a common surface point can be used to estimate a velocity function using a hyperbolic approximation.

FIG. 10 following from the work by Mayne demonstrates for a two-dimensional case as shown that the last of a series of dipping reflectors, if recorded as indicated, has a seismic expression whose geometric description incorporates an "averaged" velocity which is readily estimated—the stacking velocity. This stacking velocity is determined as a parameter in approximating the arrival times as they vary with source-receiver element separation for the particular reflector using a hyperbolic curve. Hence, some measure of a velocity field is usually available though it may not be very precise since it depends also on the applicability of the subsurface model to the actual situation.

Using a velocity field determined as indicated, we can calculate for any resolution element a travel time to any real source position as well as to any part of the antenna function. A few further comments about the velocity field are also needed.

Propagation velocities not only control timing of the wavefield, but also its geometric form. Changes in velocity cause raypaths to bend according to the well known Snell's Law. The equivalent effect in terms of wavefields involves changes in their curvature. Clearly then, any error or uncertainty in knowing the velocity field inevitably limits image resolution. A linked-variable wave equation solution method which seeks to achieve propagation medium imaging must allow appropriately for wavefield geometry change, but will be subject to limitations in attainable resolution owning to the velocity field. A simple analogy to the situation would be viewing the scene through eyeglasses having an incorrect prescription. Improving the prescription—equivalent to correcting the velocity field—would necessarily improve the image.

It follows then that image quality can become a criterion for refining the velocity field in an iterative manner. That is, an initial velocity function may be estimated and applied with updates or corrections made which in turn improve the focus or sharpness of the image. The efficient wavefield imaging computation previously described using one-way travel times makes such computation quite practical.

Turning now to the field seismic data, a profile is considered which is from data originally acquired offshore Louisiana in 1985. The real source is an array of airguns of varying size whose precise signature or effective seismic wavelet is unknown. It was rated by the manufacturer as producing significant frequency content between 10 and 90 Hz. A total of 120 receiver elements—actually "ganged" closely spaced hydrophones comprising each element—were spaced out at 82.5 ft. intervals, and dragged into positions as appropriate at the water bottom. Digital recording using an interval of 2 msec between samples was applied, but not until after the data while still in analog form had been high-cut filtered. In this manner, frequencies above 128 Hz were attenuated in significantly increasing measure with increasing frequency.

Data were acquired referenced to sea level and salt water sound velocities are known to acceptable accuracy. It still was necessary to reshape the pulse describing the propagating wavefield over time. This was in fact accomplished using statistical means. Operations such as these which are essentially standard are well documented in texts such as Yilmaz, op. cit., which can be consulted in regard to necessary detail.

Velocity analyses based on CDP gathers and as discussed here earlier were compiled at one-quarter mile intervals to develop the necessary velocity function. For the portion of the profile treated, however, there was virtually no observed horizontal change or gradient in the velocity field.

Figure 11A:
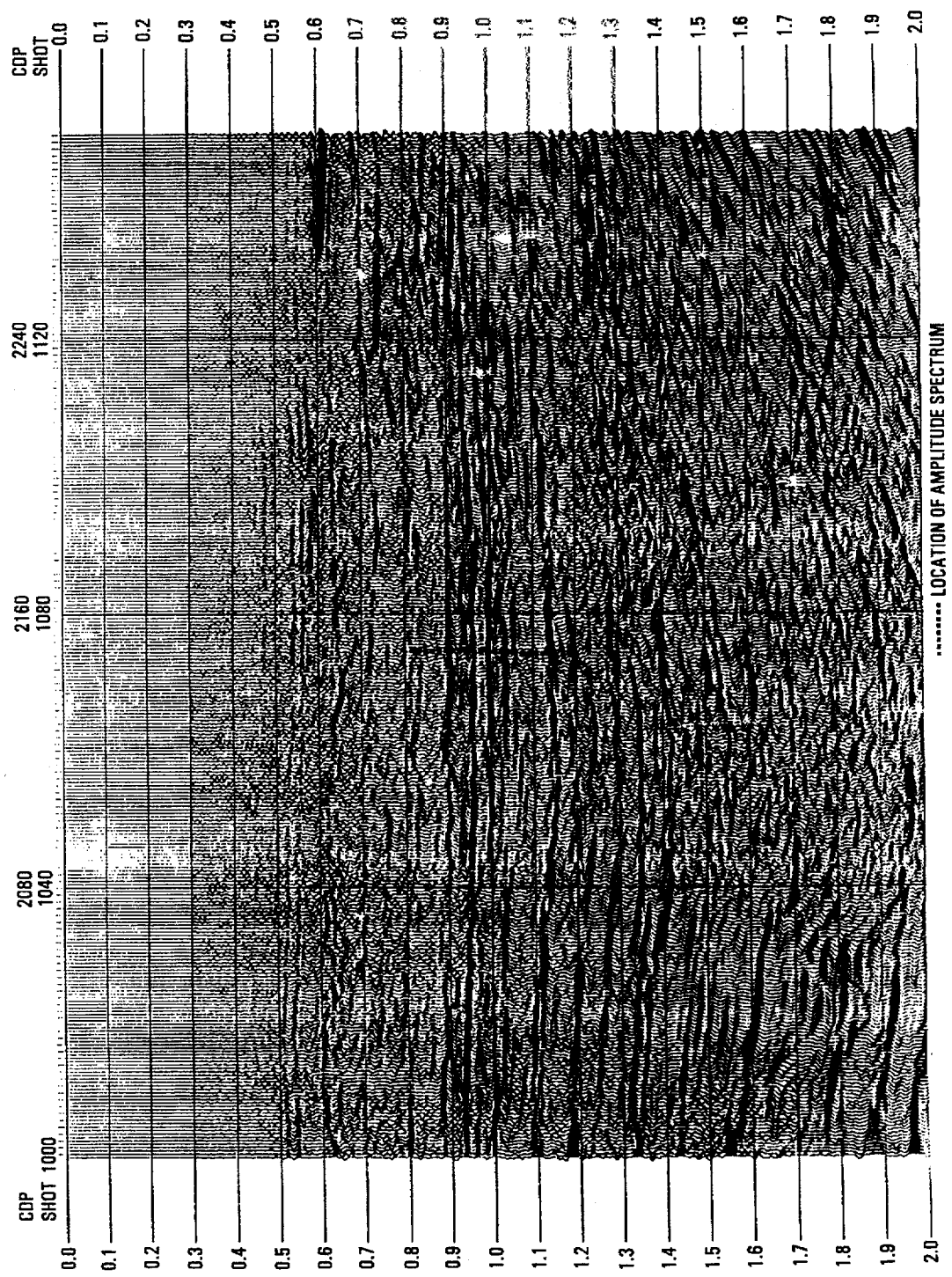
FIG. 11A shows a profile of seismic data acquired and imaged with 2 msec time sampling using commercially available Kirchhoff migration.

FIG. 11A is a view of the particular seismic line as processed using a conventional commercially available two-dimensional pre-stack Kirchhoff migration method for the final imaging. It was also based on a linked-variable wave equation solution. The counterpart Huygens-type imaging performed according to the present invention for this same basic data is presented in FIG. 11B. Such imaging has been termed modified Kirchhoff migration and the result has been presented with the same spatial and time sampling intervals (41.25 ft. and 2 msec, respectively). The two displays are quite comparable as we would expect, particularly for this case where lateral velocity charge is minimal.

Figure 11B:
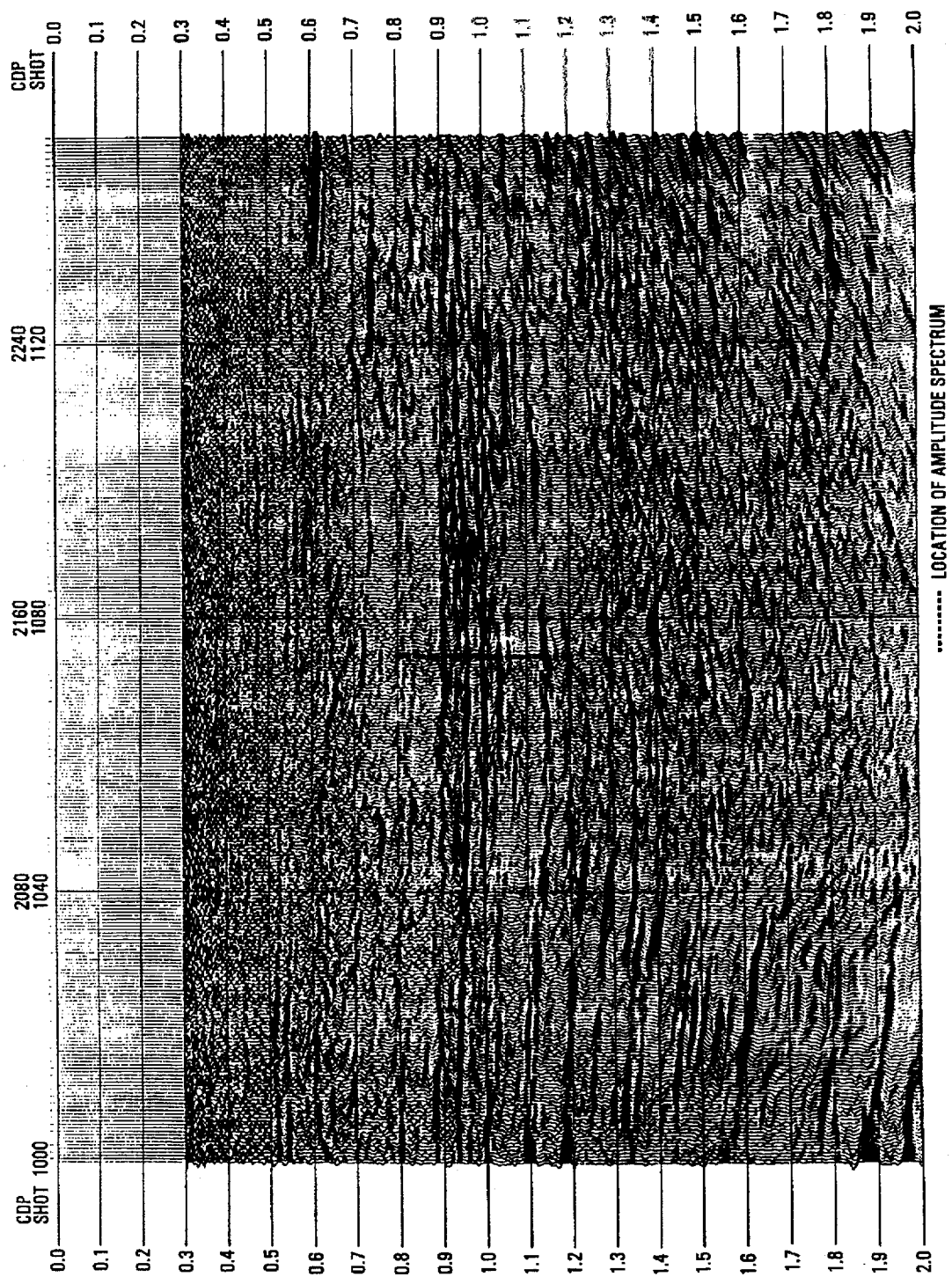
FIG. 11B shows the profile as described in FIG. 11A as imaged using modified Kirchhoff migration according to the present invention.

FIGS. 11A and 11B use standard seismic imaging display formats as had been described earlier for the study of the model data. It will be apparent that the field data has a background noise level which was not present in the model data (refer to FIGS. 9B and 9C).

For the scale of display offered by FIGS. 11A and 11B comparison in detail cannot be easily made. Hence, at the like positions indicated on both Figures, amplitude spectra are calculated and these can be studied in FIG. 11C. A common method of normalization was applied and it is evident that the modified Kirchhoff migration (extended Huygens' Imaging) of FIG. 11B has somewhat higher frequency content. This result is not in any sense definitive or of special significance since the 2 msec computation has only limited capacity to represent frequencies above 125 Hz, particularly in view of the filtering as applied to the original data.

The modified Kirchhoff migration or Huygens-type computation was, however, repeated using a 1 msec. time sampling interval for the final imaging. Now the comparison to be made is between the 1 msec and 2 msec imaging using the same Huygens' approach. One may look at close-ups of comparable time history displays in the seismic format as previously described as well as in terms of frequency content using amplitude spectra.

It is important to recognize that evaluation of results from a real data study always embodies a higher degree of uncertainty than a model study computation if only because of the presence of noise upon which comment was made. In this case, detected presence of higher frequencies (125 Hz and beyond) might be attributed to amplification of signal content of small size present in the source signature or else system noise. Appropriate arguments must therefore be made to support any conclusions reached.

Next, one must be alert to and watch for out-of-plane contributions since this is a two-dimensional view derived from a three-dimensional earth. In this case, such effects have been judged not to interfere with results or conclusions to any level of significance.

There is an even more subtle element concerning the imaging of higher frequencies having geologic origin which must also be considered. First, one must accept that higher frequencies in the time variable correspond to thinner units in the earth. Thinner units usually have less areal extent than thicker ones. Hence, as wavefronts of the propagating wavefield grow in radius with increasing time (or depth) the spatial extent of an inhomogeneity must also increase in order to have discernable coherent effect on the wavefield. Consideration of the first Fresnel zones (analogous to their definition in optics) and their relation to reflections is an alternate way to think about this effect, and is discussed by Yilmaz in his work already cited.

Hence given limited accuracy of the velocity function and other practical issues such as system noise, etc., one would expect to see a diminishing ability to image the highest frequencies in the earth with recorded travel time or correspondingly reflector depth. For this reason, the comparisons to be made as indicated here would be viewed using frequency analyses, but also at different travel times.

Figure 11D:
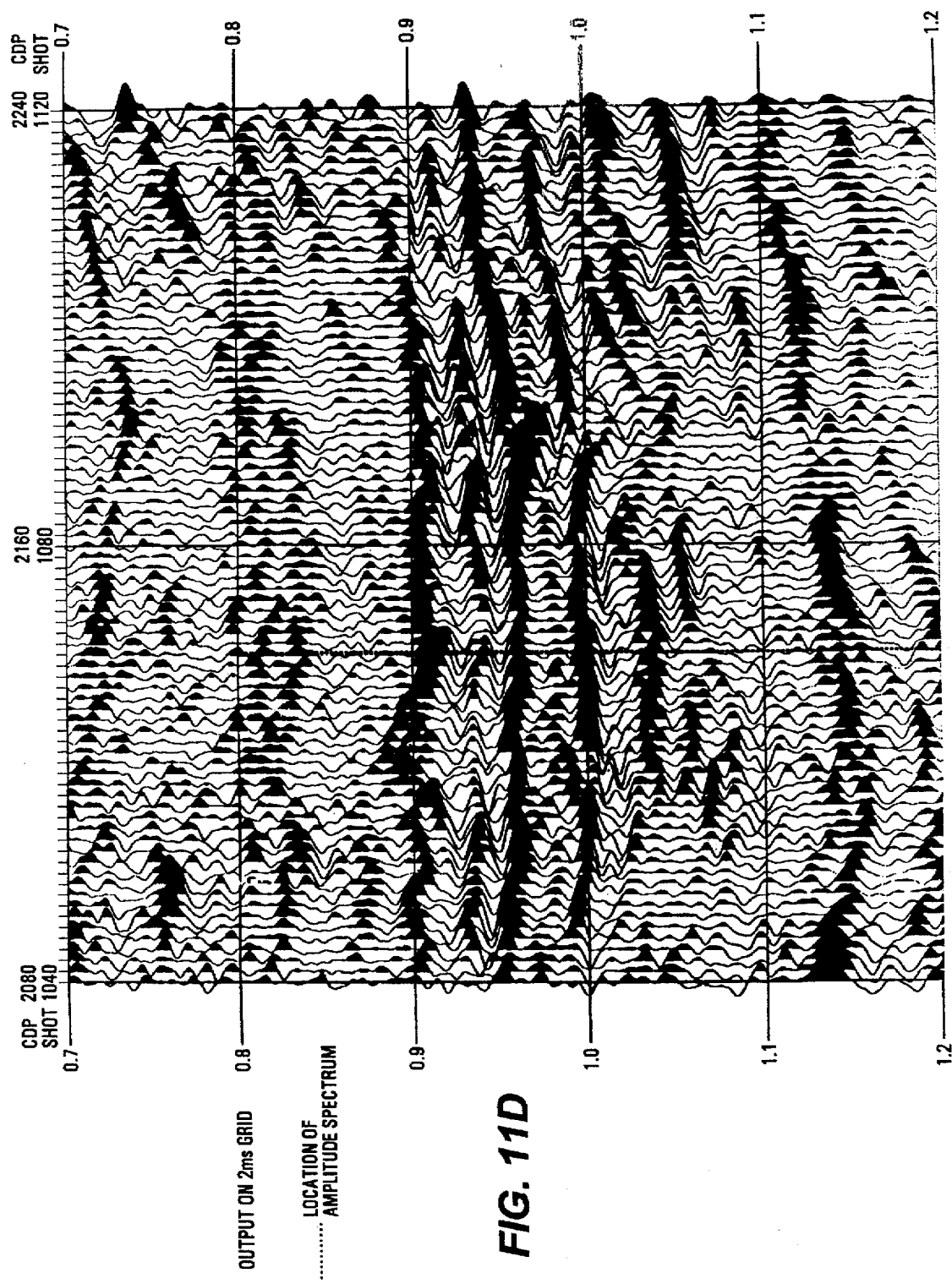
FIG. 11D shows an enlarged view of a portion of the image of FIG. 11B.
Figure 11E:
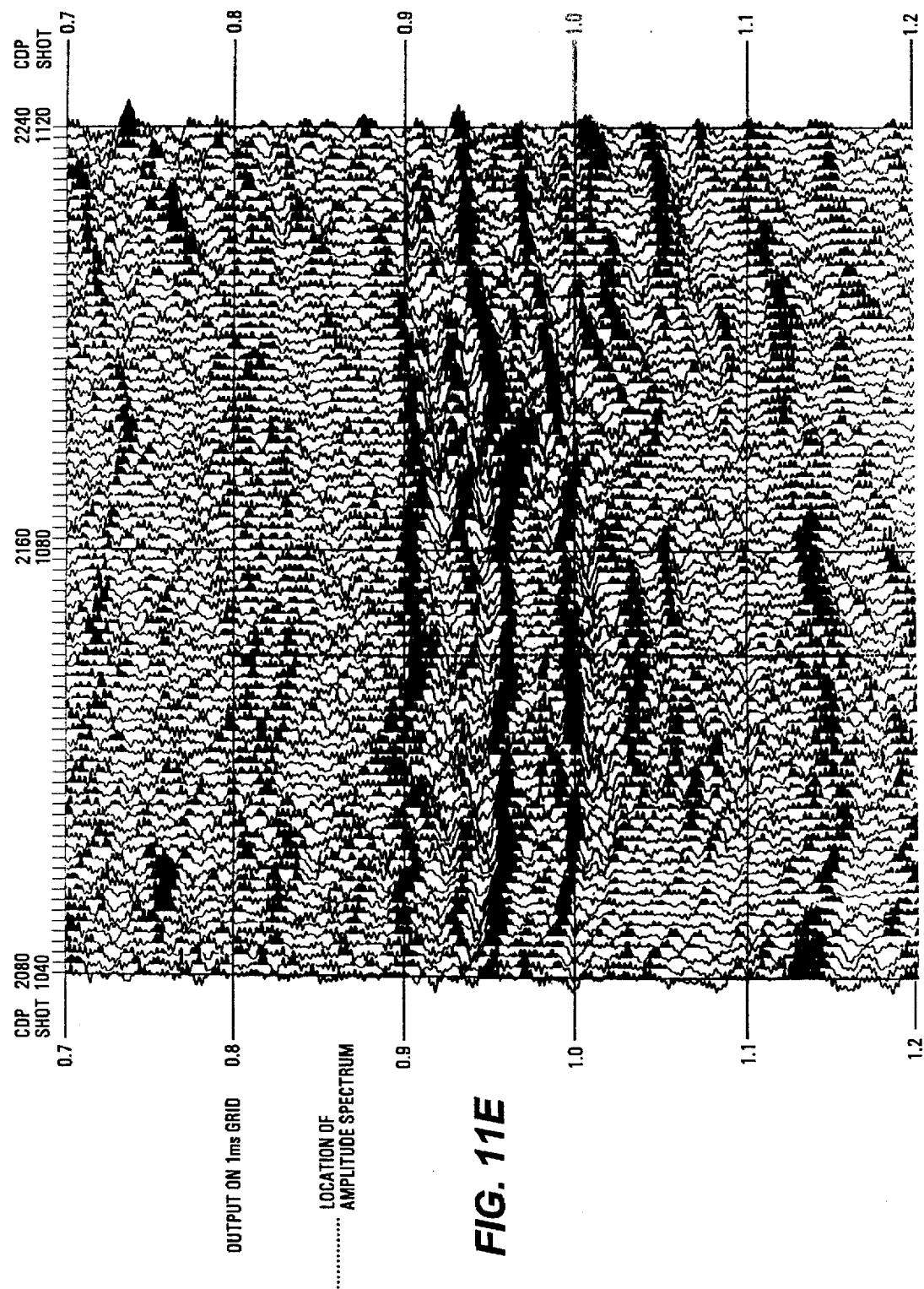
FIG. 11E shows an analogous portion of an image as in FIG. 11D using the same initial data but sampled at 1 msec using modified Kirchhoff migration according to the present invention.
Figure 11F:
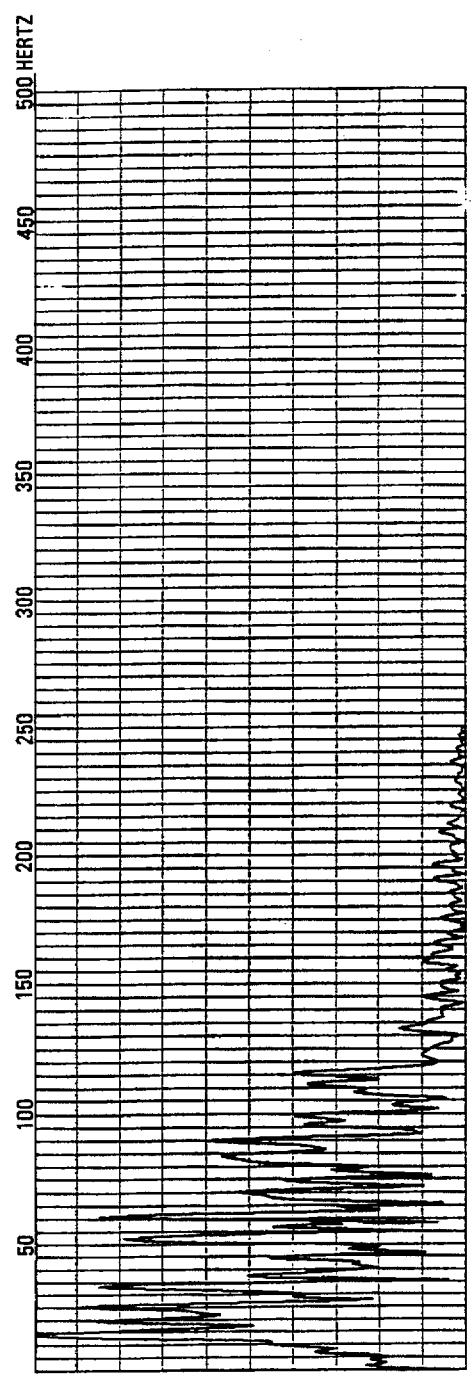
FIG. 11F contrasts amplitude spectra for the profile of FIGS. 11A through 11E, inclusive as imaged using modified Kirchhoff migration at 2 msec and 1 msec, respectively, for an image below ground location CDP 2100 from 0.4 to 0.8 sec.
Figure 11F:
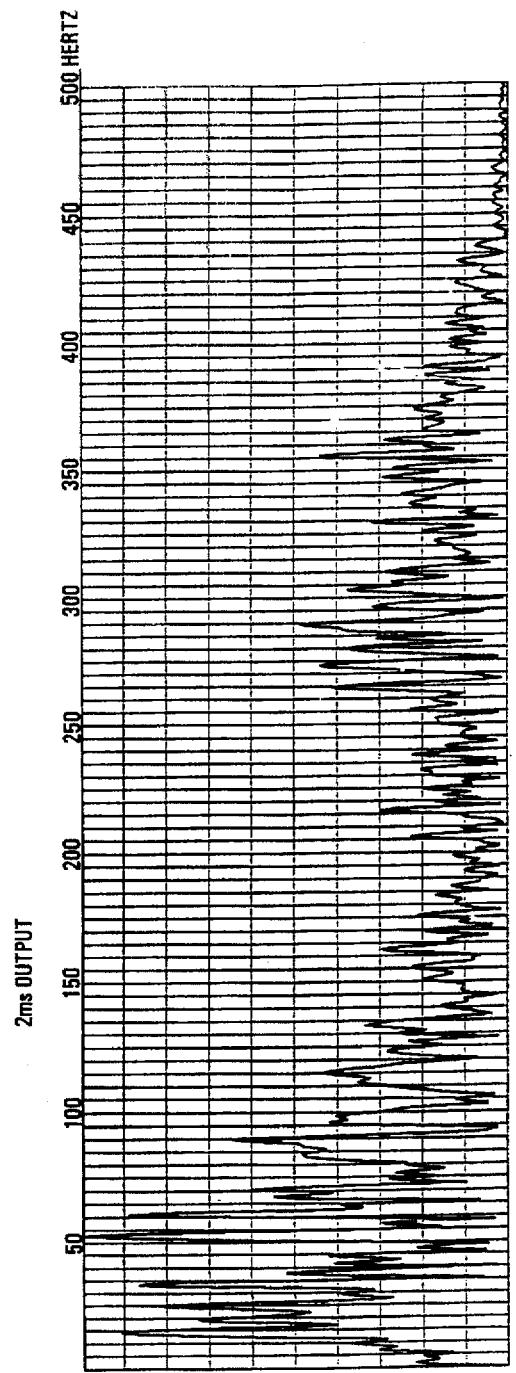
Figure 11G:
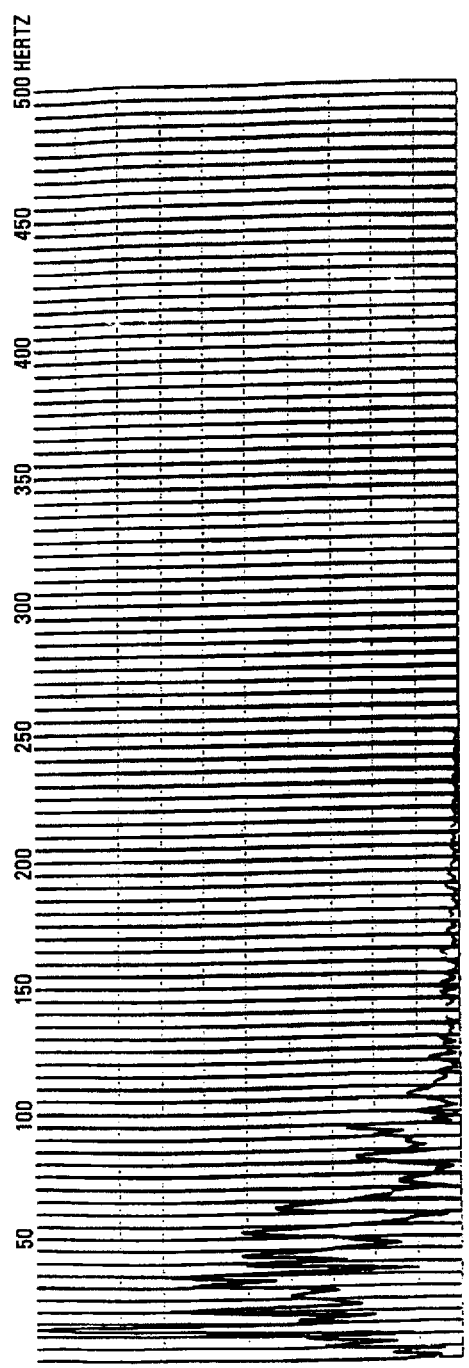
FIG. 11G contrasts amplitude spectra as in FIG. 11F for imaging below ground location CDP 2150 from 0.8 to 1.2 sec.
Figure 11G:
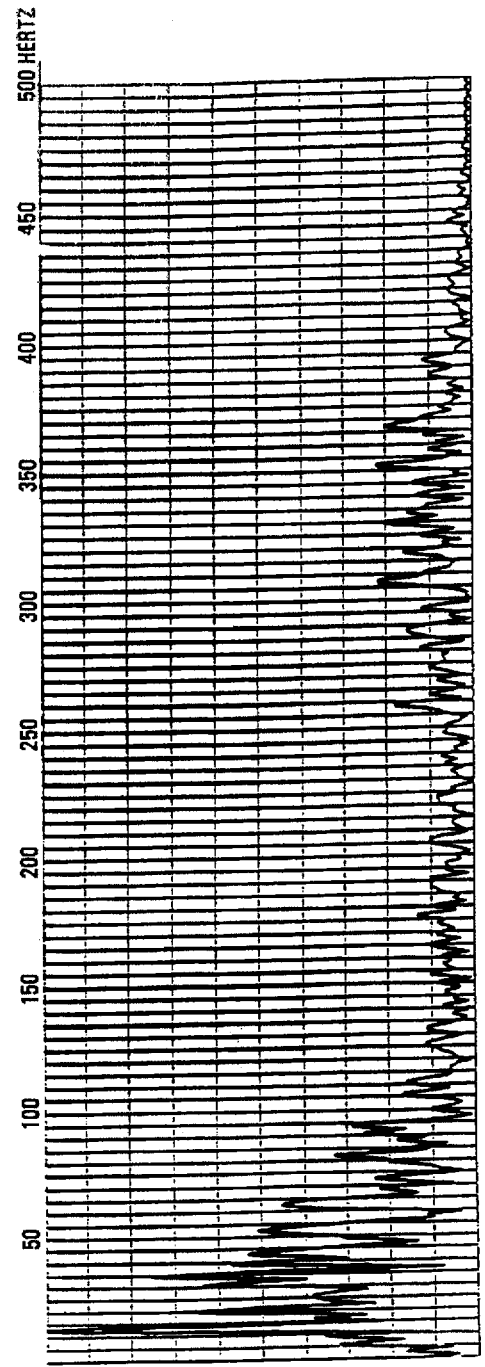
Figure 11H:
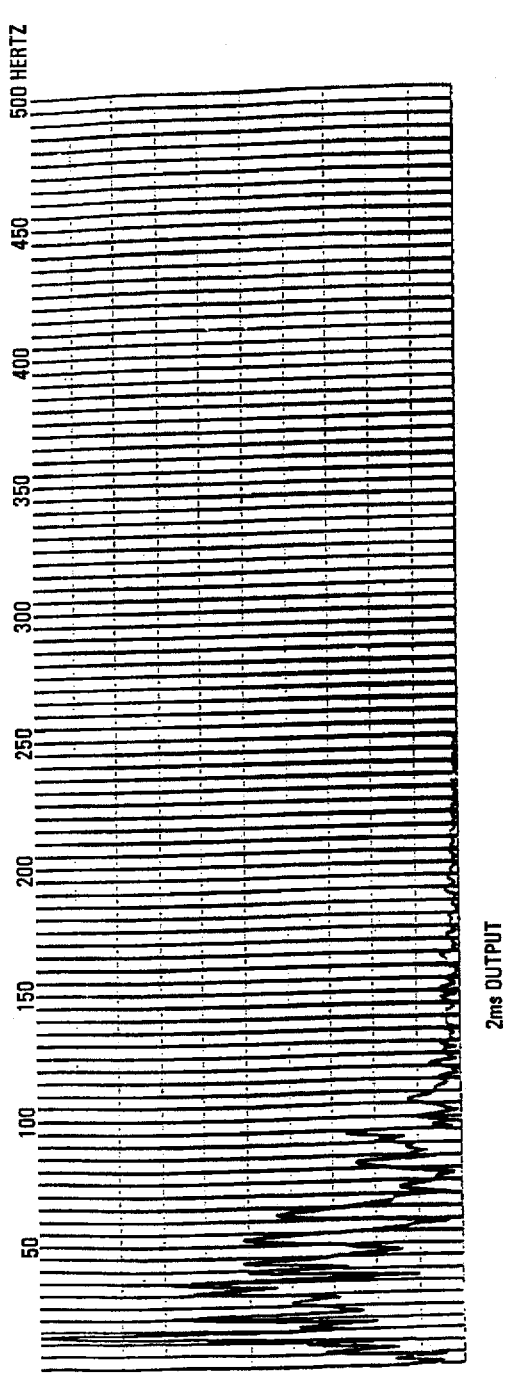
FIG. 11H contrasts amplitude spectra as in FIG. 11F for imaging below ground location CDP 2200 from 1.1 to 1.5 sec.
Figure 11H:
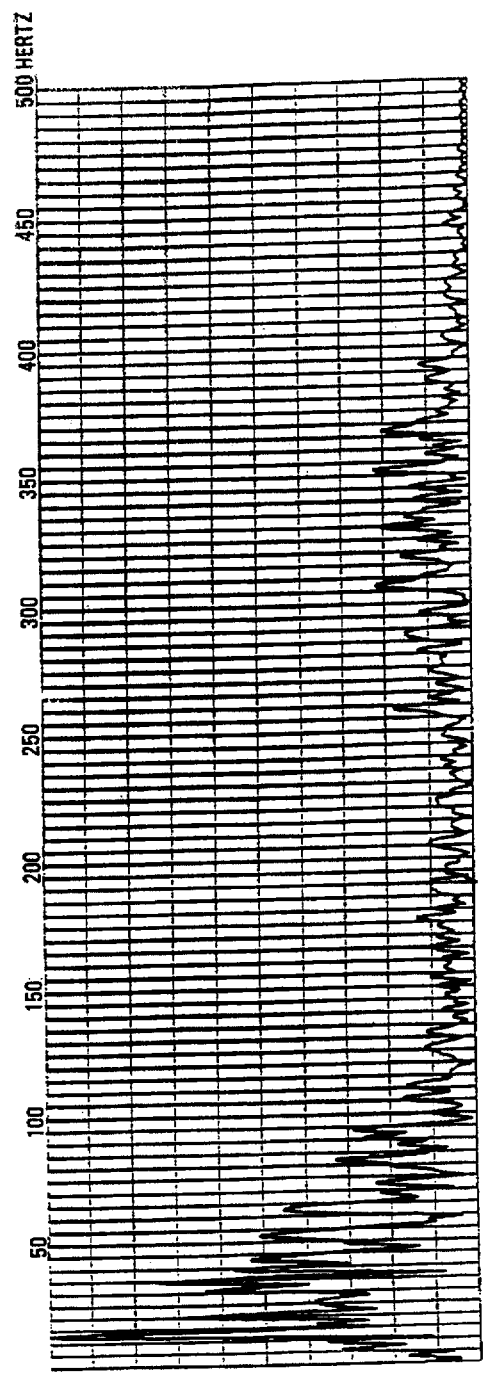
Figure 11I:
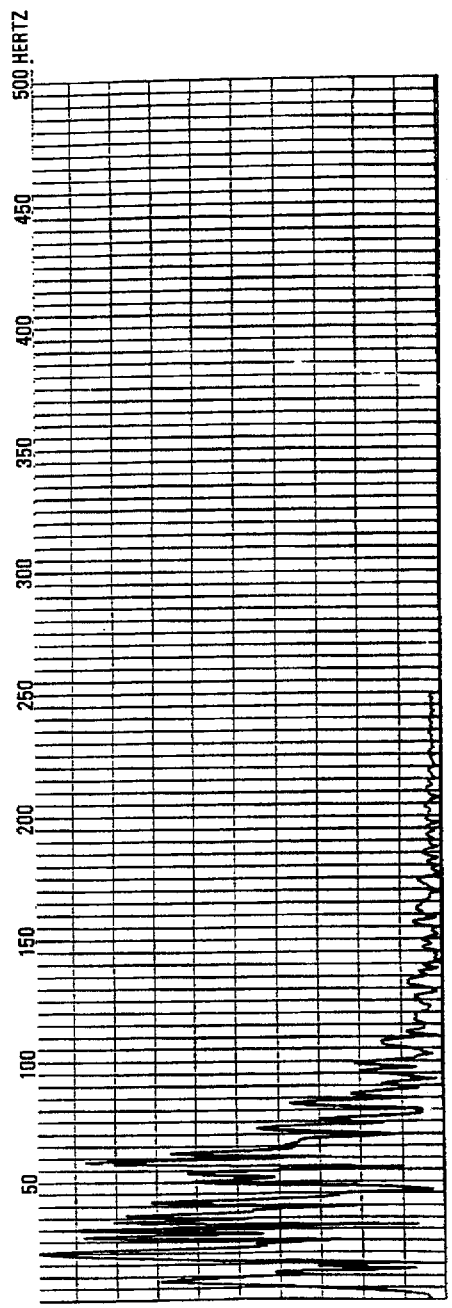
FIG. 11I contrasts amplitude spectra as in FIG. 11H for imaging below ground location CDP 2120 from 1.1 to 1.5 sec.
Figure 11I:
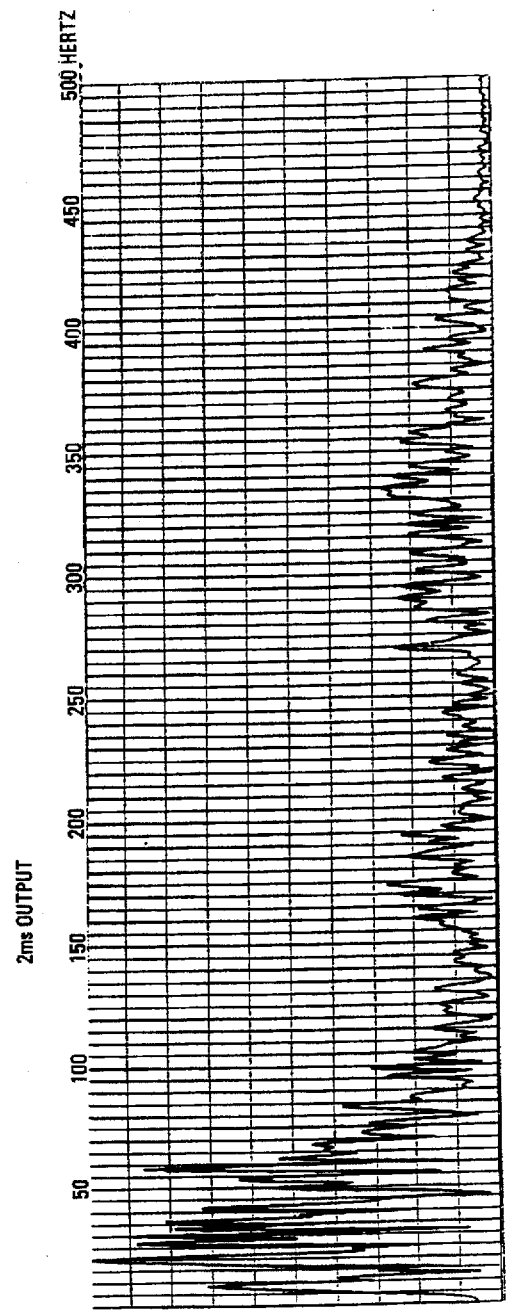

The magnified displays of FIGS. 11D and 11E make quite clear the presence of much higher frequency content in the version imaged with 1 msec time sampling as compared with the 2 msec imaging. These higher frequency contributions must be considered to be real for two reasons. First, they show lateral continuity from spatial sample to sample, and this continuity is conformable to the geologic features as indicated by the imaging at the lower frequencies (2 msec imaging). Amplification of noise should not show this same degree of spatial coherence. Also, spatial continuity deriving from image blurring, following from velocity function error would show elliptical continuity rather than following the geology since such geometric pattern was a feature of the wavefield imaging method as applied.

Frequency domain comparisons of amplitude spectra (FIG. 11F through 11I) show the presence of the higher frequencies in the 1 msec imagings as compared to 2 msec imagings. As expected also, the analysis from the shallowest part of the data (0.4 to 0.8 sec.) shows the greatest concentration of the higher frequency components. It is most unlikely that frequencies three times higher than the nominal high cut-off as designated by the manufacturer of the real seismic source (airgun array) could be attributed to residual signal amplification—especially in view of the analog filtering also as applied. It is only reasonable to conclude that such signal content derives from the space-time variable linkage inherent in the Huygens-type imaging of the earth as virtual sources in each grid cell. These apparent frequencies which are likely beyond the effective bandwidth of the source suggest that the spatial resolution of the seismic imaging is significantly greater than Nyquist criteria allow as applied to the original wavefield sampling in consideration of the individual variables.

Hence, this example though two-dimensional illustrates the practical nature of this invention. Frequencies though apparent were accessed via wavefield reconstruction imaging which were both beyond those deemed to be representable using Nyquist criteria (for the 2 msec initial data acquisition) and beyond those present in the real source.

The foregoing disclosure and description of the invention are illustrative and explanatory thereof. Various changes in the techniques, processing parameters, acquisition parameters and the like, as well as in the details of the illustrated embodiments may be made without departing from the spirit of the invention.

I claim:

1. A method of imaging a virtual source comprising the steps of:

illuminating a medium with a propagating wavefield having a certain frequency spectrum from a real source;

sampling the propagating wavefield;

performing wavefield reconstruction at the virtual source location to form the image, using at least one apparent frequency component which is substantially not present in the illumination wavefield from the real source at the virtual source location.

2. The method of claim 1, wherein said step of performing wavefield reconstruction uses apparent frequency components within the frequency spectrum of said real source.

3. The method of claim 1, wherein said step of performing wavefield reconstruction uses apparent frequency components within a discrete sampling of the frequency spectrum of said real source.

4. The method of claim 1, wherein said apparent frequency component is greater than any comparable frequency component measured for the real source.

5. The method of claim 1, wherein said apparent frequency component is less than any comparable frequency component measured for the real source.

6. The method of claim 1, wherein said propagating wavefield is ultrasonic in nature.

7. The method of claim 1, wherein said propagating wavefield is electromagnetic in nature.

8. The method of claim 1, wherein said propagating wavefield is acoustic in nature.

9. A method of imaging a source from a propagating wavefield comprising the steps of:

performing a sampling which is discrete in at least one variable of the wavefield;

performing linked-variable reconstruction of the wavefield;

assigning resolution during the linked-variable reconstruction of the variable having apparent frequency content outside the Nyquist limits for said sampling; and forming an output record of the single variable results of said step of linked-variable reconstruction.

10. The method of claim 9, wherein said source is a real source.

11. The method of claim 9, wherein said source is virtual source.

12. The method of claim 9, wherein said step of performing wavefield reconstruction uses apparent frequency components within the frequency spectrum of said real source.

13. The method of claim 9, wherein said step of performing wavefield reconstruction uses apparent frequency components within a discrete sampling of the frequency spectrum of said real source.

14. The method of claim 9, wherein said propagating wavefield is ultrasonic in nature.

15. The method of claim 9, wherein said propagating wavefield is electromagnetic in nature.

16. The method of claim 9, wherein said propagating wavefield is acoustic in nature.

17. A method of imaging a medium as a result of its illumination by a propagating wavefield, comprising the steps of:

sampling the propagating wavefield with a known antenna function;

said step of sampling being discrete in at least one variable, performing wavefield reconstruction at a location in the medium, by performing the steps of:

recovering at least one apparent frequency corresponding to said discrete variable outside the band defined by sampling theory criteria;

using space-time coupled solutions to the Wave Equation based on velocities of the propagating wavefield in the medium.

18. The method of claim 17, wherein said step of performing wavefield reconstruction uses apparent frequency components within the frequency spectrum of said real source at the reconstruction location.

19. The method of claim 17, wherein said step of performing wavefield reconstruction uses apparent frequency components within a discrete sampling of the frequency spectrum of said real source at the reconstruction location.

20. The method of claim 17, wherein said recovered apparent frequency component is greater than any significant frequency component measured for the illumination.

21. The method of claim 17, wherein said recorded apparent frequency component is less than any significant frequency component measured for the illumination.

22. The method of claim 17, wherein said propagating wavefield is ultrasonic in nature.

23. The method of claim 17, wherein said propagating wavefield is electromagnetic in nature.

24. The method of claim 17, wherein said propagating Wavefield is acoustic in nature.

25. A method of processing data indicative of physical objects in an area of interest, comprising the steps of:
    causing energy to travel at a velocity which may vary as a function of both time and space during such travel through the area of interest;
    forming a record sampling the energy received after travel through the area of interest in a time varying manner;
    processing the record of energy received to obtain a representation of objects present in the area of interest having resolution unrestricted by any frequency limitation of the discrete sampling of the recording in space or time derived from sampling theory as applied to the individual variables, by performing the steps of:
    partitioning the record into a number of energy arrival times for a range of possible locations in the field of interest;
    assigning a range of postulated object locations in the field of interest for the energy at a particular energy arrival time based on the velocity of travel over the area from an energy source;
    repeating said step of assigning for each of the energy arrival times for each energy source and the postulated object locations;
    forming an output record indicating as actual object locations those postulated object locations exhibiting probity according to the linked processing variables of time and space for the energy sources and sampled records.

26. The method of claim 25, wherein said energy source is located outside the area of interest and wherein said step of processing further has resolution unrestricted by the frequency content of the energy in space or time.

27. The method of claim 25, wherein said propagating wavefield is ultrasonic in nature.

28. The method of claim 25, wherein said propagating wavefield is electromagnetic in nature.

29. The method of claim 25, wherein said propagating wavefield is acoustic in nature.

30. A method of imaging a virtual source, comprising the steps of:
    illuminating a medium with a propagating wavefield from a real source;
    sampling the propagating wavefield using one or more receiver elements;
    performing linked-variable reconstruction at the virtual source location using at least one apparent frequency which is substantially not present in the illumination wavefield from the real source, said step of performing comprising the step of:
    determining one-way travel times for each real source and each receiver element to each virtual source for each velocity function;
    adding for the virtual source the one-way travel times for each pairing of a real source and receiver element;
    substituting a recorded amplitude for the two-way travel time for each virtual source corresponding to that recorded at each time for said real source and receiver element pairings,
    repeating and substitutions for all virtual sources and all real source and receiver element pairings;
    summing said substituted amplitudes; and
    forming an output record to thereby image said virtual source.

31. The method of claim 29, wherein said designated resolution is unrestricted by the frequency content of any of said real sources or property of the wavefield sampling required by Nyquist sampling criteria as applied to the individual variables.

32. The method of claim 30, further including the steps of:
    normalizing the recorded wavefield value to compensate for wavefield spreading over distance travelled; and
    normalizing the results of said step of summing based on the number of values summed.

33. The method of claim 30, wherein said propagating wavefield is ultrasonic in nature.

34. The method of claim 30, wherein said propagating wavefield is electromagnetic in nature.

35. The method of claim 30, wherein said propagating wavefield is acoustic in nature.

36. The method of claim 30, wherein said step of performing wavefield reconstruction uses apparent frequency components within the frequency spectrum of said real source illumination.

37. The method of claim 30, wherein said step of performing wavefield reconstruction uses apparent frequency components within a discrete sampling of the frequency spectrum of said real source illumination.

38. A method of imaging a virtual source comprising the steps of:
    illuminating a medium with a propagating wavefield from at least one real source; and
    sampling said wavefield using one or more receiver elements said sampling being discrete in at least one variable;
    performing linked-variable wavefield reconstruction using said sampling at the virtual source location using at least one apparent frequency component for said discrete variable outside of those as allowed by sampling theory as applied to the individual variables, said step of performing comprising the step of:
    determining one-way travel times for each real source and each receiver element to each virtual source using a velocity function;
    adding for the virtual sources the one-way travel times for each pairing of a real source and receiver element;
    substituting a recorded wavefield value for the two-way travel time for each virtual source corresponding to that recorded at each time for said real source and receiver element pairing;

repeating said substitutions for all virtual sources and all real source and receiver element pairings;

summing all said substituted amplitudes; and forming an output record to thereby image said virtual source.

39. The method of claim 38, further including the steps of:

normalizing the recorded wavefield value to compensate for wavefield spreading over distance travelled; and normalizing the results of said step of summing based on the number of values summed.

40. The method of claim 38, wherein said propagating wavefield is ultrasonic in nature.

41. The method of claim 38, wherein said propagating wavefield is electromagnetic in nature.

42. The method of claim 38, wherein said propagating wavefield is acoustic in nature.

43. The method of claim 38, wherein said step of performing wavefield reconstruction uses apparent frequency components within the frequency spectrum of said real source illumination.

44. The method of claim 38, wherein said step of performing wavefield reconstruction uses apparent frequency components within a discrete sampling of the frequency spectrum of said real source illumination.

45. A method of imaging a virtual source in a propagation medium, of a known velocity function, through which energy travels from at least one real source to a plurality of receiver elements, by linked-wavefield reconstruction, comprising the steps of:

determining one-way travel times from each real source and each receiver element in pairs to the virtual source based on a known velocity function;

calculating said one-way travel times using spherical wavefronts centered about each real source and receiver element based on a velocity function appropriate to each;

adding the determined one-way travel times for each of the source and receiver element pairings for each virtual source;

substituting a measured amplitude for a two-way travel time at each virtual source location corresponding to that recorded at each time for the real source and receiver element pairing;

repeating said step of substituting for each of the real source and receiver element pairings;

summing the substituted amplitudes at each virtual source location; and forming an output record of the results of said step of summing to thereby image the virtual source.

46. The method of claim 45, wherein said propagating wavefield is ultrasonic in nature.

47. The method of claim 45, wherein said propagating wavefield is electromagnetic in nature.

48. The method of claim 45, wherein said propagating wavefield is acoustic in nature.

49. The method of claim 45, further including the steps of:

normalizing the recorded wavefield value to compensate for wavefield spreading over distance travelled; and normalizing the results of said step of summing based on the number of values summed.

50. The method of claim 45, further including the step of:

sampling the energy traveling through the medium.

51. The method of claim 50, wherein said step of performing wavefield reconstruction uses apparent frequency components within the frequency spectrum of said real source illumination at said virtual source.

52. The method of claim 50, wherein said step of performing wavefield reconstruction uses apparent frequency components within a discrete sampling of the frequency spectrum of said real source illumination at said virtual source.

53. The method of claim 50, wherein said image contains at least one apparent frequency component greater than any significant frequency component measured for the real source illumination at said virtual source.

54. The method of claim 50, wherein said image contains at least one apparent frequency component less than any significant frequency component measured for the real source illumination at said virtual source.

55. The method of claim 50, wherein said image contains at least one apparent frequency component outside Nyquist limits of sampling as applied to the individual variables.

56. The method of claim 1, wherein said propagating wavefield is elastic in nature.

57. The method of claim 9, wherein said propagating wavefield is elastic in nature.

58. The method of claim 17, wherein said propagating wavefield is elastic in nature.

59. The method of claim 25, wherein said propagating wavefield is elastic in nature.

60. The method of claim 30, wherein said propagating wavefield is elastic in nature.

61. The method of claim 38, wherein said propagating wavefield is elastic in nature.

62. The method of claim 45, wherein said propagating wavefield is elastic in nature.

* * * * *